US008200648B2

(12) United States Patent
Boiman et al.

(10) Patent No.: US 8,200,648 B2
(45) Date of Patent: Jun. 12, 2012

(54) DATA SIMILARITY AND IMPORTANCE USING LOCAL AND GLOBAL EVIDENCE SCORES

(75) Inventors: Oren Boiman, Tel-Aviv (IL); Michal Irani, Rehovot (IL)

(73) Assignee: Yeda Research & Development Co. Ltd. at the Weizmann Institute of Science, Rehovot (IL)

( * ) Notice: Subject to any disclaimer, the term of this patent is extended or adjusted under 35 U.S.C. 154(b) by 225 days.

(21) Appl. No.: 12/376,787

(22) PCT Filed: Aug. 7, 2007

(86) PCT No.: PCT/IL2007/000980
§ 371 (c)(1),
(2), (4) Date: Apr. 13, 2010

(87) PCT Pub. No.: WO2008/018064
PCT Pub. Date: Feb. 14, 2008

(65) Prior Publication Data
US 2010/0191722 A1 Jul. 29, 2010

Related U.S. Application Data

(60) Provisional application No. 60/835,895, filed on Aug. 7, 2006.

(51) Int. Cl.
*G06F 17/30* (2006.01)
(52) U.S. Cl. ........................................ 707/706; 707/749
(58) Field of Classification Search .................. 707/706, 707/749
See application file for complete search history.

(56) References Cited

U.S. PATENT DOCUMENTS
6,230,154 B1 * 5/2001 Raz et al. ...................... 707/740
(Continued)

FOREIGN PATENT DOCUMENTS
WO    WO 2006/100674        9/2006

OTHER PUBLICATIONS

S. Altschul, W. Gish, W. Miller, E. Myers, and D. Lipman. Basic local alignment search tool. *JMolBiol*, 215:403-410, 1990.

(Continued)

*Primary Examiner* — Kim Nguyen
(74) *Attorney, Agent, or Firm* — Daniel J. Swirsky; AlphaPatent Associates Ltd.

(57) ABSTRACT

A method includes finding regions of a reference signal which provide at least one of: local evidence scores and a global evidence score. The local evidence scores indicate local similarity of the regions of the reference signal to regions of a query signal and the global evidence score defines the extent of a global similarity of the query signal to the reference signal. A media exploring device is also included which includes an importance encoder and a media explorer. The importance encoder generates importance scores of at least portions of digital media as a function of at least one of local evidence scores and global evidence scores. The media explorer enables exploring through the digital media according to (i) the importance scores, (ii) data associations/links induced by the evidence scores between different portions of the digital media. The device may also include a media player to play the digital media with adaptive speeds as a function of the importance scores. The device may also include a labeling/annotation module which inherits labels/annotations/markings according to the abovementioned data associations.

44 Claims, 13 Drawing Sheets

U.S. PATENT DOCUMENTS

| | | | | |
|---|---|---|---|---|
| 6,240,424 | B1* | 5/2001 | Hirata | 707/749 |
| 6,285,995 | B1* | 9/2001 | Abdel-Mottaleb et al. | 707/737 |
| 7,792,887 | B1* | 9/2010 | Amirghodsi | 382/165 |
| 7,860,854 | B2* | 12/2010 | Lipson et al. | 707/707 |
| 7,996,395 | B2* | 8/2011 | Li et al. | 707/723 |
| 2003/0018631 | A1 | 1/2003 | Lipson et al. | |
| 2008/0208828 | A1 | 8/2008 | Boiman et al. | |

OTHER PUBLICATIONS

Bart and S. Ullman. Class-based matching of object parts. In *ideoRegister04*, p. 173, 2004.

A. Birnbaum. On the foundations of statistical inference. *J. Amer. Statist. Assoc*, 1962.

M. Blank, L. Gorelick, E. Shechtman, M. Irani, and R. Basri. Actions as space-time shapes. In *ICCV05*, pp. II: 1395-1402, 2005.

O. Boiman and M. Irani. Detecting irregularities in images and in video. In *ICCV05*, pp. I: 462-469.

P. Felzenszwalb and D. Huttenlocher. Pictorial structures for object recognition. *IJCV*, 61(1):55-79, 2005.

R. Fergus, P. Perona, and A. Zisserman. Object class recognition by unsupervised scale-invariant learning. In *CVPR03*.

S. Lazebnik, C. Schmid, and J. Ponce. Beyond bags of features: Spatial pyramid matching for recognizing natural scene categories. In *CVPR06*, to appear.

D. Lowe. Distinctive image features from scale-invariant keypoints. *IJCV*, 60(2):91-110, 2004.

J. Shi and J. Malik. Normalized cuts and image segmentation. *PAMI*, 22(8):888-905, Aug. 2000.

J. Sivic, B. Russell, A. Efros, A. Zisserman, and W. Freeman. Discovering objects and their localization in images. In *ICCV05*, pp. I: 370-377.

P. Viola and W. Wells, III. Alignment by maximization of mutual information. In *ICCV95*, pp. 16-23.

Freeman et al. "Learning low-level vision", *IJCV*, 2000.

Yedidia et al. *Understanding belief propagation and its generalizations*, pp. 239-269, 2002.

S. Belongi et al. Matching Shapes. In *ICCV*, Jul. 2001.

Shechtman E., et al. Matching Local Self-Similarities across Images and Videos, *IEEE Conference on Computer Vision and Pattern Recognition 2007 (CVPR'07)*).

J. Shi et al. (Normalized cuts and image segmentation. In CVPR'97, pp. 731-737, 1997).

T.H. Corman, C.E. Leiserson and R.L. Rivest "Introduction to Algorithms" MIT Press and McGraw-Hill 1994.

* cited by examiner

DATA SIMILARITY AND IMPORTANCE USING LOCAL AND GLOBAL EVIDENCE SCORES

CROSS-REFERENCE TO RELATED APPLICATIONS

This application is a national filing application from PCT application PCT/IL2007/000980 and also claims priority from U.S. Provisional Patent Application No. 60/835,895, filed Aug. 7, 2006, both of which applications are hereby incorporated in their entirety by reference.

FIELD OF THE INVENTION

The present invention relates to signal processing generally and to similarity and dissimilarity detection in signals in particular.

BACKGROUND OF THE INVENTION

Standard global image-based similarity measures (e.g., Correlation, SSD, Mutual Information, as described in the article by P. Viola and W. Wells, III. Alignment by maximization of mutual information. In *ICCV95*, pages 16-23, etc.) require prior alignment or prior knowledge of dense correspondences between signals. There are also distance measures that are based on comparing empirical distributions of local image features, such as "bags of features" (e.g., the article by J. Sivic, B. Russell, A. Efros, A. Zisserman, and W. Freeman. Discovering objects and their localization in images. In *ICCV05*, pages I: 370-377).

Attempts to maintain the benefits of local methods (such as the "bags of features" method) while maintaining global structural information have recently been proposed by S. Lazebnik, C. Schmid, and J. Ponce in the article Beyond bags of features: Spatial pyramid matching for recognizing natural scene categories. In *CVPR06*, Volume: 2, pp. 2169-2178. This was done by partitioning the image into increasingly fine subregions, each region with its own feature histogram. These have been shown to improve upon the "bags of features" method, but are restricted to a preselected partitioning of the image into rectangular regions.

The article by O. Boiman and M. Irani (Detecting irregularities in images and in video, in *ICCV05*, pages I: 462-469), which article is incorporated herein by reference, describes a method for detecting irregularities in images/video as regions that cannot be composed from large pieces of data of other images/video. That approach was restricted to detecting local irregularities.

Biologists utilize large shared regions between signals to determine similarities between DNA sequences, amino acid chains, etc. Tools for finding large repetitions in biological data have been developed (e.g., "BLAST" by S. Altschul, W. Gish, W. Miller, E. Myers, and D. Lipman. Basic local alignment search tool. *J Mol Biol,* 215:403-410, 1990).

SUMMARY OF THE PRESENT INVENTION

There is provided, in accordance with a preferred embodiment of the present invention, a method including finding regions of a reference signal which provide at least one of local evidence scores and a global evidence score. The local evidence scores indicate local similarity of the regions of the reference signal to regions of a query signal and the global evidence score defines the extent of a global similarity of the query signal to the reference signal.

Additionally, in accordance with a preferred embodiment of the present invention, the method also includes determining irregular regions as regions whose local evidence scores are below a threshold. It may also include determining saliency within the query signal at least from the local evidence scores.

Moreover, in accordance with a preferred embodiment of the present invention, the method employs at least the global evidence score for clustering a multiplicity of signals.

Further, in accordance with a preferred embodiment of the present invention, the method may be used to cluster the regions within the query signal using at least the local evidence scores.

Still further, in accordance with a preferred embodiment of the present invention, the method includes segmenting the query signal using at least the local evidence scores.

Additionally, in accordance with a preferred embodiment of the present invention, the method includes marking regions of the query signal with markings from the regions of the reference signal using at least the local evidence scores. The markings include at least one of: labels, annotations, weblinks, drawings, hyper-links, comments, graphical signs, XML data, markup language data, commercials advertisements, news, relevant tasks, appointments, events, references, citations, talkbacks, contact information, financial data, blogs, newsgroup links, RSS links, bookmarks services, email information, and highlights.

Further, in accordance with a preferred embodiment of the present invention, the method includes classifying at least portions of the query signal from at least the global evidence scores. The classifying can include classifying objects in an image and a video sequence, classifying actions in a video sequence and classifying speech in an audio signal.

Still further, in accordance with a preferred embodiment of the present invention, the method includes recognizing items in the query signal as items in the reference signal using at least the global evidence scores. The items might be objects in an image, speech in an audio signal or recognizing speakers in an audio signal.

Moreover, in accordance with a preferred embodiment of the present invention, the signals might be one-dimensional, two-dimensional and three-dimensional. The signal might be a signal, a group of signals and a portion of a signal.

Further, in accordance with a preferred embodiment of the present invention, the query signal might be one portion of an input signal and the reference signal might be another portion of the input signal.

Still further, in accordance with a preferred embodiment of the present invention, the query signal and the reference signal might be visual signals, images or video sequences. They might be of the following types of signals: an acoustic signal, an electrical signal, a radar signal, a seismic signal, a voice signal, a sonar signal, a thermal signal, a medical signal, a medical image, functional magnetic resonance imaging (FMRI) data, an ultrasound signal, an electrocardiogram signal, x-ray data, range data, multi-spectral data, DNA sequence, amino acid sequence, protein data, text data, and an N-dimensional signal where N is an integer.

Moreover, in accordance with a preferred embodiment of the present invention, the finding includes for each point q in the query signal, determining candidate small regions in the reference signal which are similar to a small region in the vicinity of point q, for each candidate region of q, maximally expanding each the candidate region while increasing the local evidence score of the region and for each point q, choosing its region as the expanded region with the maximal the local evidence score.

Further, in accordance with a preferred embodiment of the present invention, the regions are represented by an ensemble of patch descriptors. The patch descriptors might be SIFT descriptors, color, grey levels, normalized color, normalized grey levels, gradient information, normalized gradient information, flow fields, normal flows, motion information, motion parameters, time derivatives, normalized time derivatives, histogram information, shape-context descriptors, self-similarity descriptors, and moment information.

Still further, in accordance with a preferred embodiment of the present invention, the local evidence score LES is defined as:

$$LES(R \mid H_{ref}) = \log_2(LR(R))$$

$$LR(R) = \frac{P(R \mid H_{ref})}{P(R \mid H_0)} = \frac{\sum_T P(R \mid T, H_{ref}) P(T \mid H_{ref})}{P(R \mid H_0)}$$

where P indicates a probability function, $H_{ref}$ is the hypothesis that a region R was generated by reference REF, $H_0$ is the null hypothesis and T is a transformation of a region of REF.

Moreover, in accordance with a preferred embodiment of the present invention, the transformation T is a geometric transformation. It might be at least one of the following types of transformations: identity, translation, rigid, rotation, reflection, scaling, affine, projective, and non-rigid.

Further, in accordance with a preferred embodiment of the present invention, the probability function P is a function of at least one of the following similarity measures: sum-of-differences, sum-of-squared differences, sum-of-absolute-differences, Lp-norms, where p is an integer, mutual information, correlation, normalized correlation, robust measures, histogram comparison measures and motion consistency measures.

Alternatively, in accordance with a preferred embodiment of the present invention, the local evidence score is defined as a point evidence score PES, as follows:

$$PES(q : H_{ref}) = \max_{R, s.t. q \in R} \frac{LES(R \mid H_{ref})}{|R|}$$

where $H_{ref}$ is the hypothesis that a region R was generated by reference REF, and |R| is the size of R.

Moreover, in accordance with a preferred embodiment of the present invention, the global evidence score is defined as:

$$GES(Q \mid H_{ref}) = \log \frac{P(Q \mid H_{ref})}{P(Q \mid H_0)} =$$

$$\log \sum_S \frac{P(Q \mid H_{ref}, S) P(S \mid H_{ref})}{P(Q \mid H_0)} = \log \sum_S P(S \mid H_{ref}) \frac{P(Q \mid H_{ref}, S)}{P(Q \mid H_0)}$$

where P indicates a probability function, $H_{ref}$ is the hypothesis that a region R was generated by reference REF, $H_0$ is the null hypothesis, Q is the query signal and S is a segmentation of Q.

Further, in accordance with a preferred embodiment of the present invention, the method also includes computing at least one of an upper and a lower bound on the global evidence score.

There is also provided, in accordance with a preferred embodiment of the present invention, a method which includes generating importance scores of at least portions of query digital media as a function of at least one of local evidence scores and global evidence scores and enabling exploring the query digital media according to the importance scores. The local evidence scores indicate local similarity of regions of reference digital media to regions of the query digital media and the global evidence score defines the extent of a global similarity of a portion of the query digital media to the reference digital media.

Further, in accordance with a preferred embodiment of the present invention, the digital media might be images, video sequences or audio data.

Still further, in accordance with a preferred embodiment of the present invention, the query digital media might be one portion of input digital media and the reference digital media might be another portion of the input digital media.

Moreover, in accordance with a preferred embodiment of the present invention, the importance scores are determined by at least one of the following: a high evidence score, a low evidence score and a combination of high and low evidence scores.

Additionally, in accordance with a preferred embodiment of the present invention, the importance scores might be user defined, pre-defined, defined by saliency within the query digital media, defined by similarity to objects, defined by similarity to actions or defined by similarity to speech.

Moreover, in accordance with a preferred embodiment of the present invention, the importance scores are defined by irregularity in the query digital media. The method might include measuring the data irregularity relative to preceding data within the query digital media, present data within the query digital media, the entire query digital media, and other portions of data within the query digital media or external reference digital media.

Further, in accordance with a preferred embodiment of the present invention, the enabling includes enabling navigating through the query digital media as a function of at least one of importance scores, associations, labels and markings in the digital media.

Still further, in accordance with a preferred embodiment of the present invention, the enabling includes enabling moving through the query digital media at adaptive speeds as a function of the importance scores of the query digital media The moving might be moving forward or moving backward.

Additionally, in accordance with a preferred embodiment of the present invention, the enabling includes enabling jumping to another interesting part of the query digital media according to the importance scores. Another interesting part might be the next or the previous interesting part.

Further, in accordance with a preferred embodiment of the present invention, the enabling includes enabling focusing on interesting parts of a current portion of the query digital media, wherein the interesting parts are defined by the importance scores.

Still further, in accordance with a preferred embodiment of the present invention, the enabling focusing includes cropping the uninteresting parts of the current portion. It might include changing the display size. For example, it might change the display size to the size of a mobile phone screen, a movie screen, a TV screen, an MP player screen, a portable screen, a thumbnail or an image preview.

Additionally, in accordance with a preferred embodiment of the present invention, the enabling focusing includes also changing the temporal length of the video sequence. For example, it might generate a shorter video clip, play only the interesting parts of the current portion or omit the uninteresting parts of the current portion. It might generate a video thumbnail, a video clip, a video summary, a movie trailer, a video synopsis, or a video preview.

Moreover, in accordance with a preferred embodiment of the present invention, enabling includes also ranking portions of the query digital media as a function of the importance scores. This might include sorting items as a function of the ranking. The items might be image files, video sequence files, audio files, file directories, files found on the internet or files retrieved by a search engine.

Additionally, in accordance with a preferred embodiment of the present invention, the enabling includes enabling highlighting important regions in the query digital media, wherein the important regions have high importance scores.

Further, in accordance with a preferred embodiment of the present invention, the method includes extracting important images from a set of images, wherein the important images have high importance scores. This may be used to generate a summary of an image directory, wherein the image directory is the query digital media and the summary is the important images.

Alternatively, in accordance with a preferred embodiment of the present invention, the method includes extracting important sequences from a set of video sequences, wherein the important sequences have high importance scores. This might be used to generate a video summary, a video preview, a video synopsis or a video directory summary.

Further alternatively, in accordance with a preferred embodiment of the present invention, the method includes extracting important frames from a video sequence, wherein the important frames have high importance scores. This might be used to generate a story board or a video index.

There is also provided, in accordance with a preferred embodiment of the present invention, a method which includes finding regions of reference digital media which provide local evidence scores, as defined above, and providing, associations from the reference digital media to regions of query digital media which have high local evidence scores.

Additionally, in accordance with a preferred embodiment of the present invention, the method includes using the associations for at least one of the following: enabling navigation through the query digital media and propagating markers within the digital media.

There is also provided, in accordance with a preferred embodiment of the present invention, a media playing exploring device which includes an importance encoder and a media explorer. The importance encoder generates importance scores of at least portions of query digital media as a function of at least one of local evidence scores and global evidence scores, as defined above, and the media explorer enables exploring the query digital media according to the importance scores.

Additionally, in accordance with a preferred embodiment of the present invention, the media explorer includes a media browser to navigate through the query digital media as a function of at least one of importance scores, associations, labels and markings in the digital media.

Moreover, in accordance with a preferred embodiment of the present invention, the media explorer includes a media player to play through the query digital media at adaptive speeds as a function of the importance scores of the query digital media.

Further, in accordance with a preferred embodiment of the present invention, the media browser includes a jumper to jump to another interesting part of the query digital media according to the importance scores.

Still further, in accordance with a preferred embodiment of the present invention, the media explorer includes a focuser to focus on interesting parts of a current portion of the query digital media, wherein the interesting parts are defined by the importance scores. The focuser might include a cropper to crop the uninteresting parts of the current portion. The focuser might include a size changer to change the display size.

Moreover, in accordance with a preferred embodiment of the present invention, the focuser includes a length changer to change the temporal length of the video sequence. The length changer might include a parts player to play only the interesting parts of the current portion.

Additionally, in accordance with a preferred embodiment of the present invention, the length changer includes a generator to generate a video thumbnail, a video clip, a video summary, a movie trailer, a video synopsis, or a video preview.

Further, in accordance with a preferred embodiment of the present invention, the media explorer includes a ranker to rank portions of the query digital media as a function of the importance scores.

Still further, in accordance with a preferred embodiment of the present invention, the device also includes a sorter to sort items as a function of the ranking from the ranker.

Additionally, in accordance with a preferred embodiment of the present invention, the media explorer includes a highlighter to highlight important regions in the query digital media, wherein the important regions have high importance scores.

Moreover, in accordance with a preferred embodiment of the present invention, the device includes an extractor to extract important images from a set of images, wherein the important images have high importance scores. The device may also include a summary generator to generate a summary of an image directory, wherein the image directory is the query digital media and the summary has the important images.

Further, in accordance with a preferred embodiment of the present invention, the device includes a sequence extractor to extract important sequences from a set of video sequences, wherein the important sequences have high importance scores.

Still further, in accordance with a preferred embodiment of the present invention, the device includes a frame extractor to extract important frames from a video sequence, wherein the important frames have high importance scores.

There is also provided, in accordance with a preferred embodiment of the present invention, a device which includes a regional similarity detector to find regions of a reference signal which provide local evidence scores, as defined above, and an associator to provide associations from the reference digital media to regions of query digital media which have high local evidence scores.

Finally, in accordance with a preferred embodiment of the present invention, the device also includes an explorer to use the associations for at least one of the following: enabling navigating through the query digital media and propagating markers within the digital media.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6 is an illustration of the process, performed by the regional similarity detector of FIG. 3, of comparing two ensembles of patches, in order to determine the extent to which they are similar;

Figure 1:
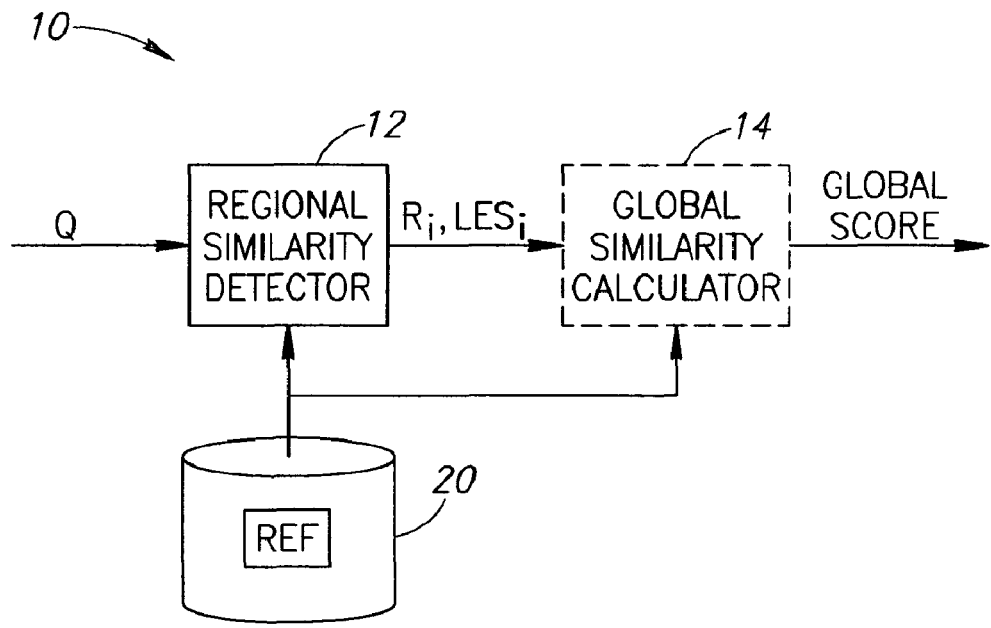
FIG. 1 is block diagram illustration of a similarity determiner, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1, which illustrates a similarity determiner 10 for determining similarity of two signals, constructed and operative in accordance with a preferred embodiment of the present invention. Determiner 10 may determine where signals are similar (i.e. "regional similarity") and may measure the overall level of similarity of the two signals (i.e. "global similarity").

Determiner 10 may comprise a regional similarity detector 12 and an optional global similarity calculator 14. Regional similarity detector 12 may determine which regions $R_i$ of an input signal Q are similar to regions $R_{ref_i}$ found in a reference signal REF. Reference signal REF may be one or more signals in a database 20 or it may be a portion of input signal Q. For the latter, regional similarity detector 12 may determine how similar a first portion of input signal Q is to the remainder of input signal Q.

Signals Q and REF may be any type of signal, and may include one-dimensional, two-dimensional and three-dimensional signals. Exemplary one-dimensional signals include voice signals, EEG, EKG, acoustic signals (e.g. sonar, ultrasound), radar, voice, seismic recordings, and other electrical signals. Exemplary two-dimensional signals include images of any type, including medical images, and exemplary three-dimensional signals include video sequences. Other signals might be a thermal signal, a medical signal, a medical image, functional magnetic resonance imaging (FMRI) data, x-ray data, range data, multi-spectral data and an N-dimensional signal where N is an integer.

Furthermore, one or both of signals Q and REF may be a group of signals, thereby to find similarity between groups of signals or between signal Q and multiple reference signals.

Optional global similarity calculator 14 may determine the overall similarity of input signal Q to reference signal REF from regions $R_i$ found by detector 12, thus determining just how similar the two signals are.

Regional similarity detector 12 may determine similarity by finding regions $R_i$ in query signal Q which may be composed using large contiguous chunks $R_{ref}$ of data from reference signal REF. Detector 12 may generate a similarity score at every point in query signal Q based on the size of its largest surrounding region $R_i$ which may be found in the signal REF (allowing for some distortions). Because regions $R_i$ may be composed for regions of signal REF, detector 12 may be able to infer new configurations in query signal Q that were not observed in reference signal REF.

Figure 2:
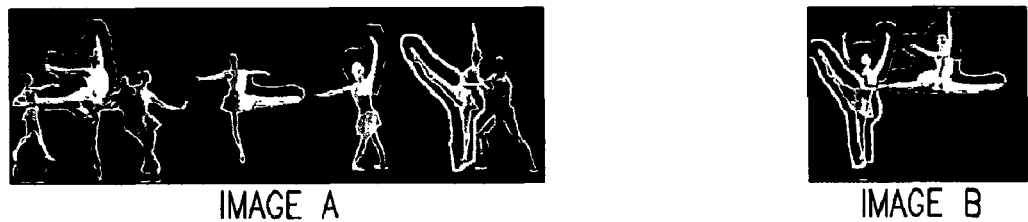
FIG. 2 is an illustration of an input, query image and a reference image, useful in understanding the operation of the similarity determiner of FIG. 1.

For instance, reference is now made to FIG. 2, which shows two images of ballerinas, Image A, the reference signal, and Image B, the query signal. Image A shows 7 dancers in many positions while image B shows 2 dancers in different positions that those of Image A. Images A and B are marked with the large regions which regional similarity detector 12 found that matched. It will be appreciated that detector 12 composed the dancers of Image B using a few (four) large contiguous chunks from Image A. It will further be appreciated that detector 12 combined the chunks from Image A in a different way to produce Image B. Because the chunks are relatively large, detector 12 may find similarity between images A and B even though the two ballet configurations observed in Image B were never observed in Image A.

Detector 12 may be utilized for detection, retrieval, classification, and clustering operations. Moreover, it can also be used for measuring similarity or dissimilarity between different portions of the same signal. Intra-signal dissimilarities can be used for detecting irregularities or saliency, while intra-signal similarities can be used as affinity measures for sophisticated intra-signal clustering and segmentation.

Reference is now made to FIGS. 3-9, which, together, illustrate a method for finding candidates for regions $R_q$, performed by regional similarity detector 12. This method is similar to that discussed in PCT Patent Application PCT/IL2006/000359, which application is incorporated herein by reference.

Figure 3:
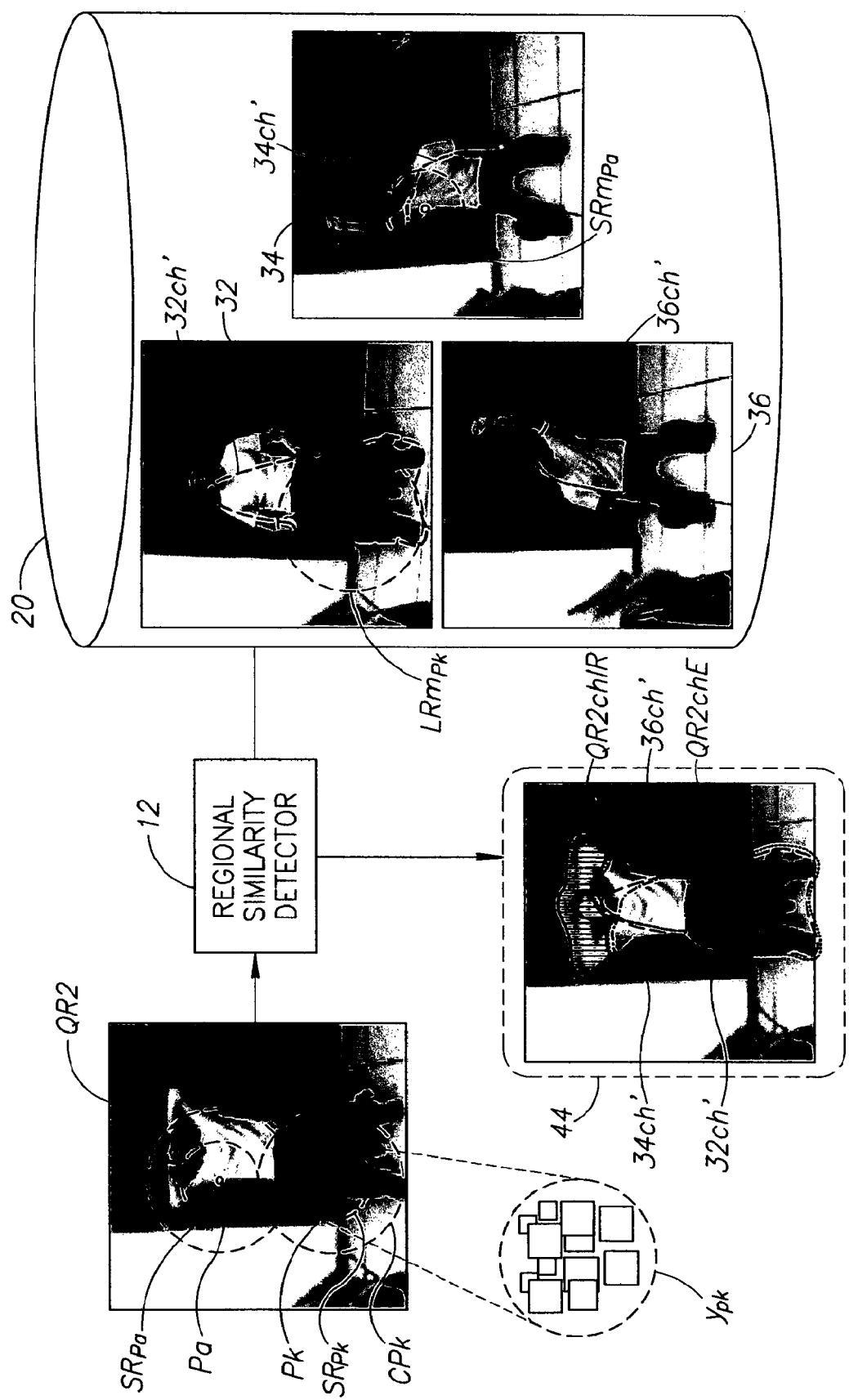
FIG. 3 is a schematic illustration of the operation of a regional similarity detector forming part of the determiner of FIG. 1.

In accordance with the present invention, a small region SR under consideration in a query, surrounding a data point P, such as exemplary region $SR_{Pk}$ or $SR_{Pa}$ of FIG. 3, may be represented as an ensemble of patches by breaking the region down into an ensemble of a few small patches at multiple scales with their relative geometric positions. Exemplary ensemble of patches $y_{Pk}$ is shown to represent region $SR_{Pk}$ in FIG. 3.

Figure 4:
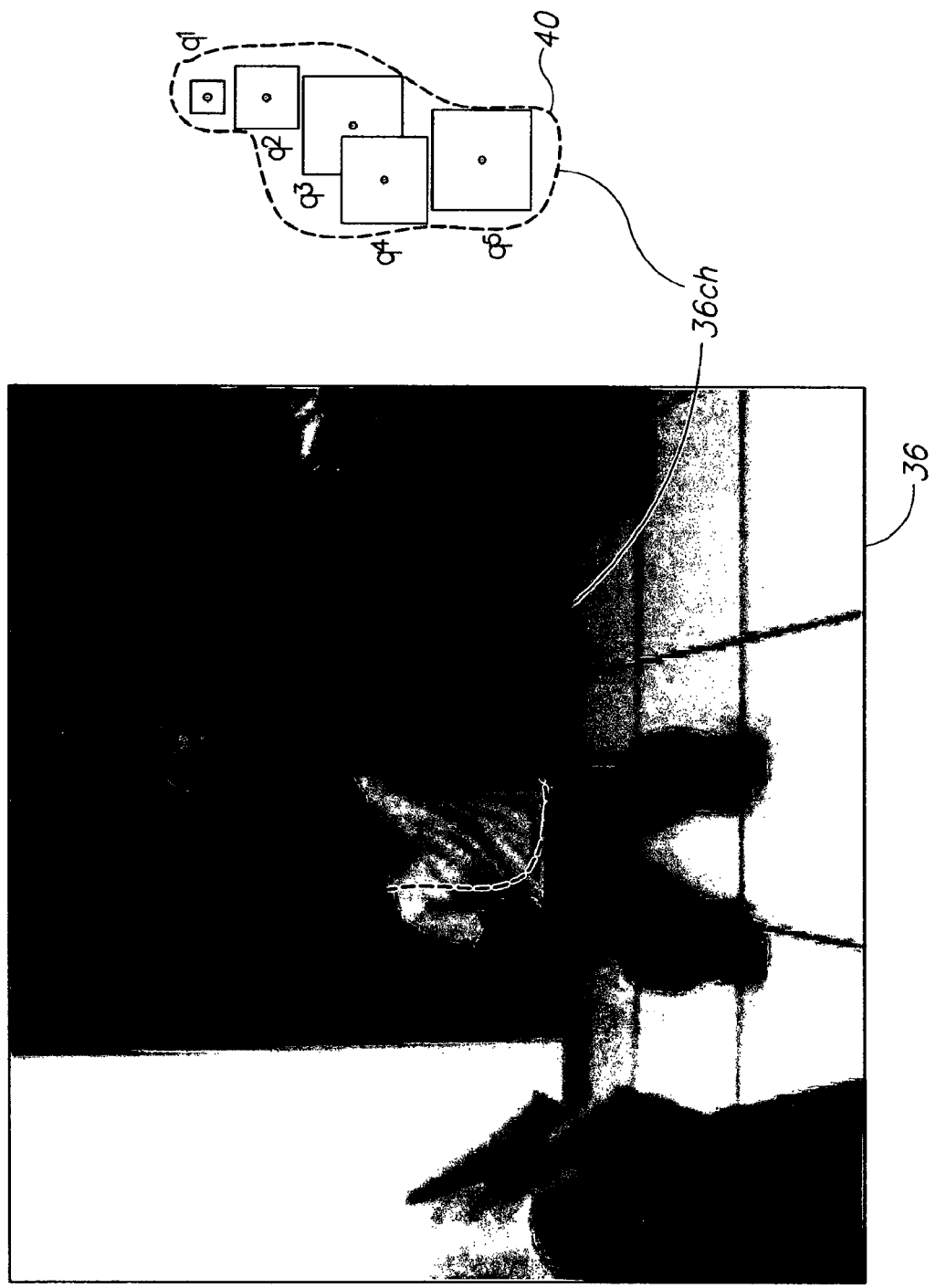
FIG. 4 is an illustration of an exemplary ensemble of patches representing a detail of an image appearing in FIG. 3.

An additional exemplary ensemble of patches is shown in FIG. 4. As shown in FIG. 4, image chunk 36*ch* is represented by ensemble 40 of patches. The patches in an ensemble, such as those in ensemble 40 of patches, may be denoted $q^1$, $q^2, \ldots q^n$, as shown in FIG. 4. An arbitrary reference point c, as shown in FIG. 4, may serve as the "origin" of the local coordinate system, and may thus define the relative positions of the patches within the ensemble. For example, reference point c may be the center of the ensemble. Alternatively, reference point c may be any other point which may serve as a reference point for the ensemble.

In the inference process of the present invention, regional similarity detector 12 may search, in database 20, for a similar geometric configuration of patches with similar properties (e.g., of behavior, or of appearance) to query ensemble $y_P$ (FIG. 3), while allowing for small local misalignments in the relative geometric arrangement of the patches. This is illustrated in FIG. 5 which illustrates a search by regional similarity detector 12.

Figure 5:
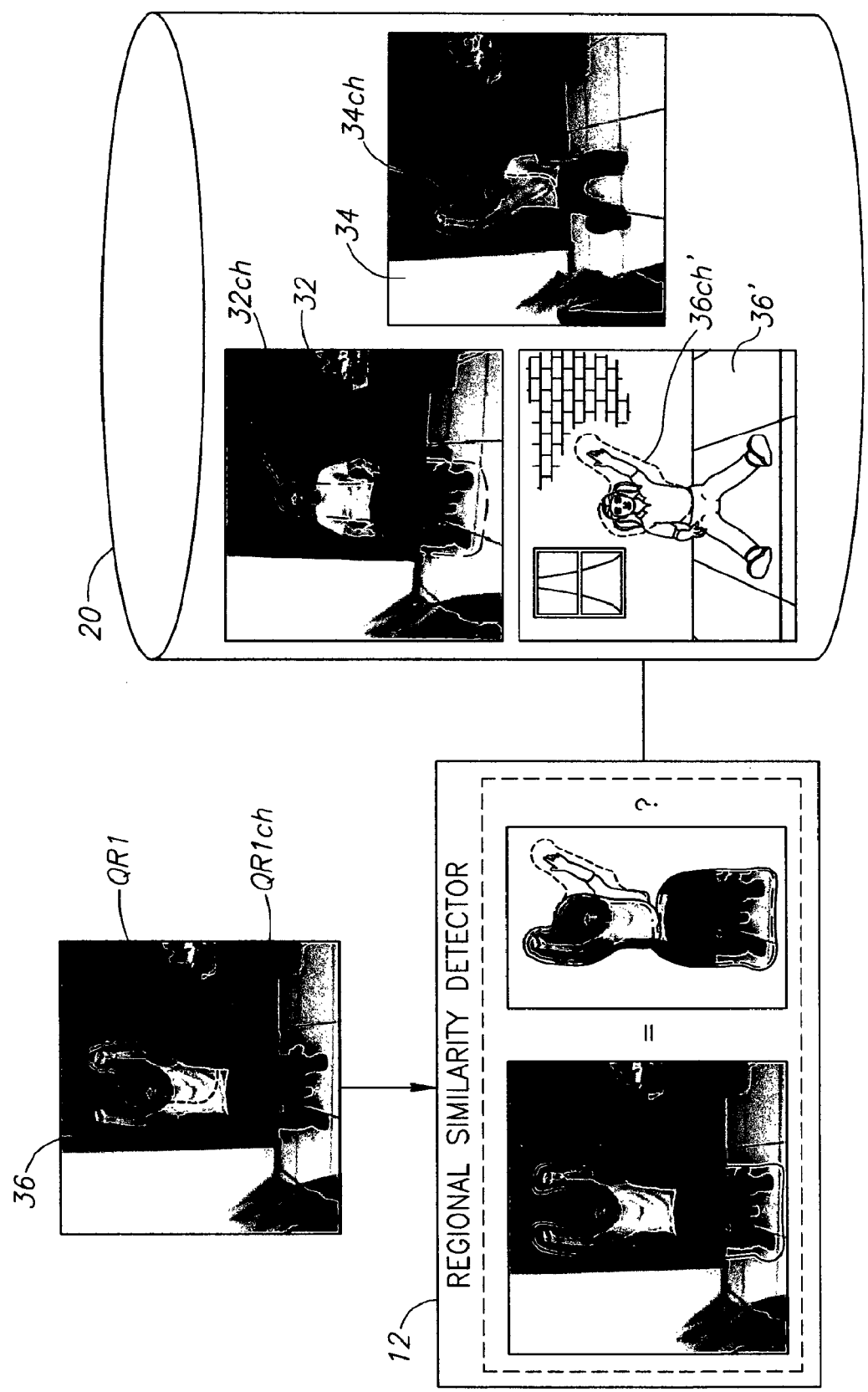
FIG. 5 is an illustration of the operation of regional similarity detector of FIG. 3 with alternative referential data.

As shown in FIG. 5, the position of the person shown sitting with her left arm raised in image 36' is substantially similar to the position of the person shown sitting with his left arm raised in query image QR1. However, the person shown in image 36' is not the same person shown in query image QR1. Image 36' shows a woman who is shorter and fatter as well as of a different gender than the man shown in image QR1. Whether due to the physical differences between the man and the woman, or to a slightly different position in which the woman is holding up her arm vis-à-vis the man, or a combination of both, it may be seen in FIG. 5 that the overall configuration of the raised left arm in image 36' is similar, but somewhat misaligned with respect to the configuration of the raised left arm of the man in query QR1.

Figure 7:
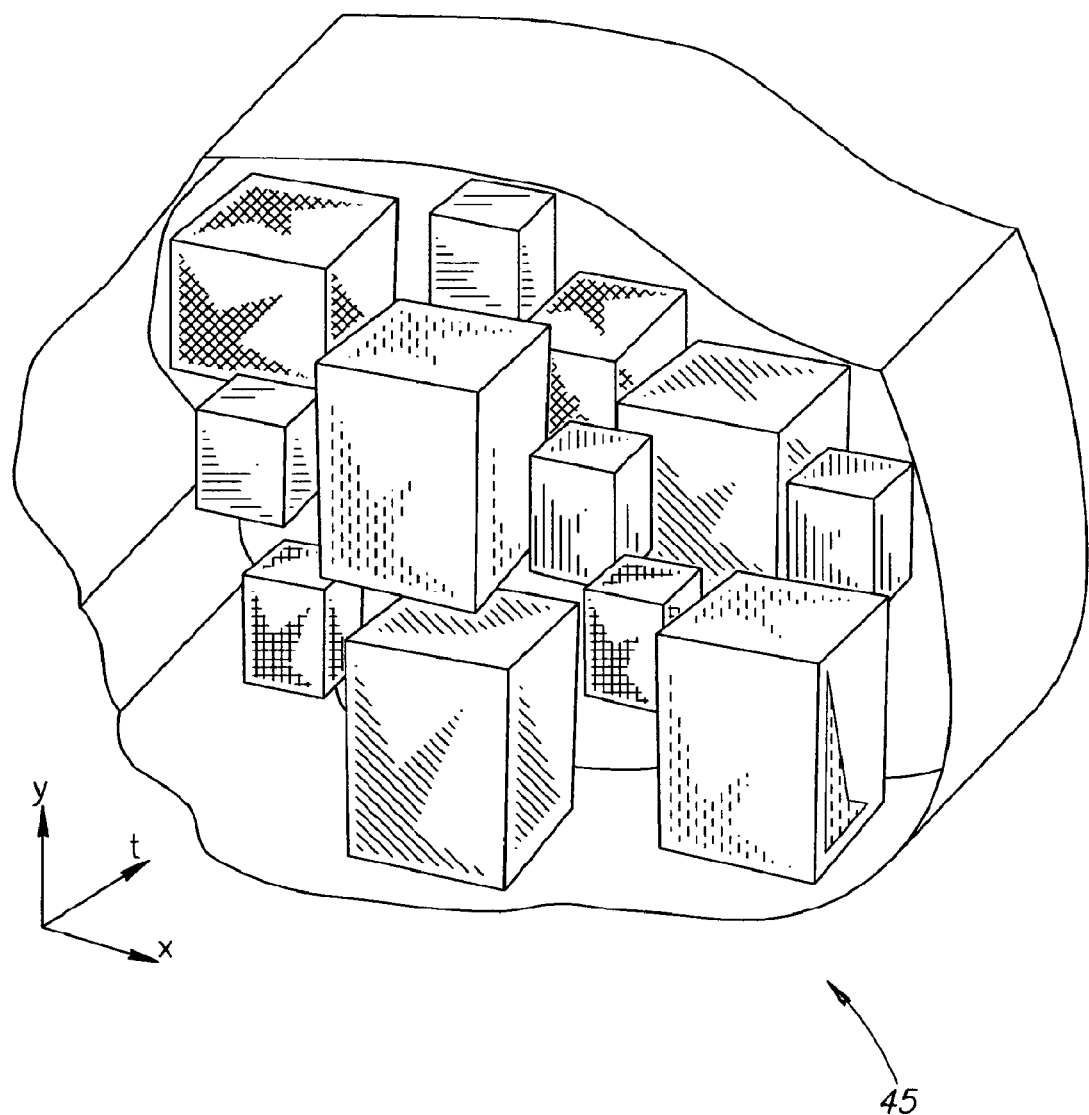
FIG. 7 is an illustration of an exemplary ensemble of patches composed of spatio-temporal patches, employed in accordance with the present invention for processing 3-dimensional data.

In accordance with the inference process described hereinabove, and the mathematical algorithms provided in the present invention, which will be discussed later in further detail with respect to FIG. 7, regional similarity detector 12 may determine the extent to which the ensemble of patches representing database data chunk 36*ch*' provides a match for the ensemble of patches representing query data chunk QR1*ch*, the data chunk in query QR1 for which data chunk 36*ch*' ostensibly provides a match.

Figure 6:
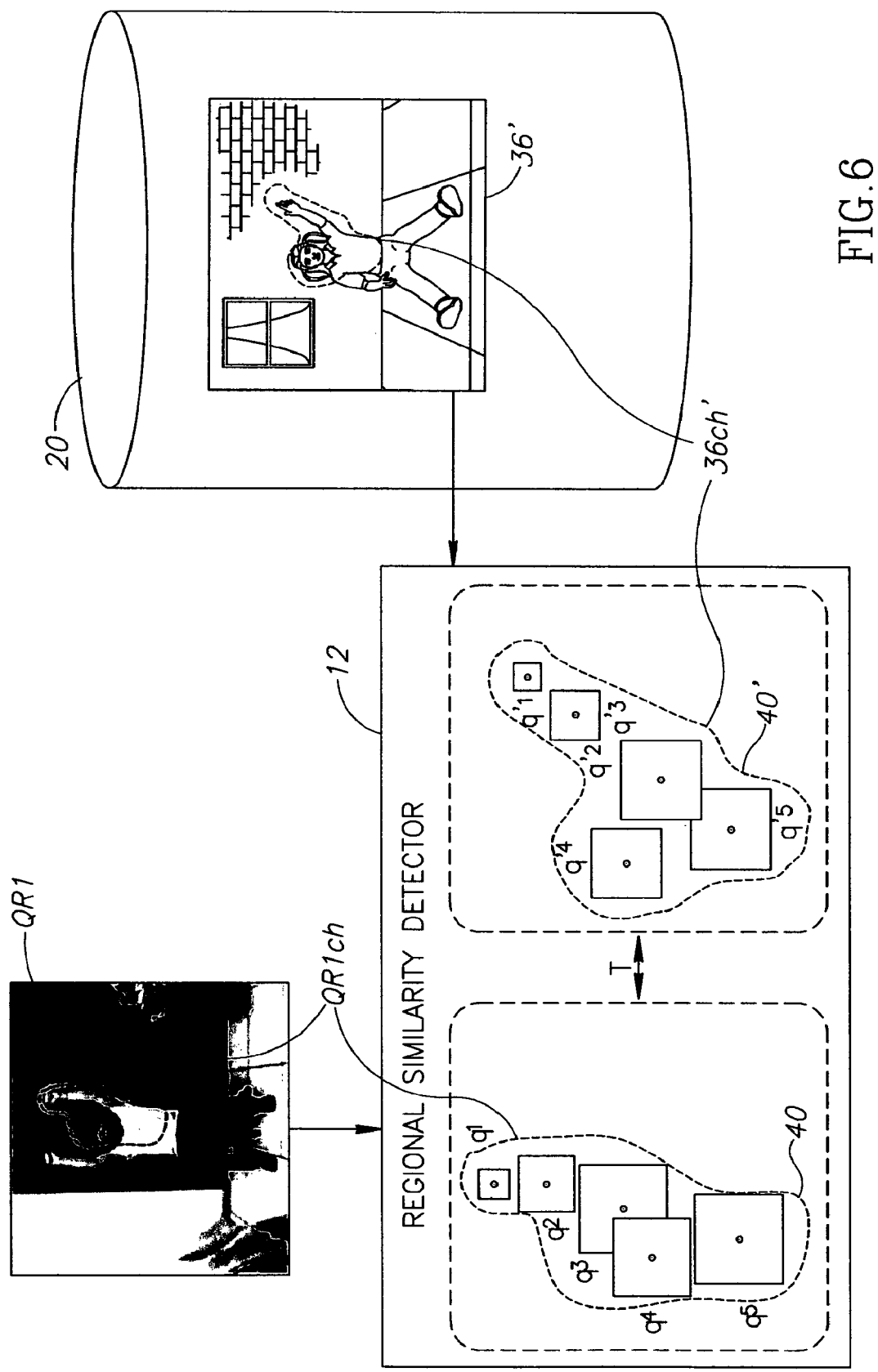

These two ensembles of patches are shown adjacent to one another in FIG. 6, reference to which is now made. Ensemble 40 of patches represents data chunk QR1ch which is substantially identical to data chunk 36ch (FIG. 4). Ensemble 40' of patches is shown to represent data chunk 36ch'. As shown in FIG. 6, ensemble 40 of patches comprises patches $q^1$, $q^2$, $q^3$, $q^4$ and $q^5$ while ensemble 40' of patches comprises corresponding patches $q^{'1}$, $q^{'2}$, $q^{'3}$, $q^{'4}$ and $q^{'5}$. While the similarity of the images of the upraised left arm in query QR1 and image 36' is schematically illustrated in FIG. 6 by the similarity between the corresponding patches in the two representative ensembles (40 and 40' respectively), the misalignment between the two images is also schematically illustrated in FIG. 6 by the translational shifts in the geometric configuration of the patches in ensemble 40' with respect to the geometric configuration of the patches in ensemble 40.

In accordance with the present invention, regional similarity detector 12 may determine the extent to which ensembles of patches 40 and 40' are similar, based on properties of appearance, behavior, etc., while allowing for small local misalignments in the relative geometric arrangement of the patches. That is, regional similarity detector 12 may detect small non-rigid deformations in these exemplary images, yet still determine that the images are similar enough such that the query image is provided support by the database image. It will be appreciated that this may be the case for any data compared by regional similarity detector 12 in accordance with the present invention.

It will be appreciated that ensembles of patches such as ensembles 40 and 40' (FIG. 6), which are composed of spatial patches, may be employed for processing 2-dimensional image data. For the analysis of video sequences, in which large chunks in space-time may be compared, the ensembles of patches employed may be composed of spatio-temporal patches, which may capture information about dynamic behaviors. An exemplary ensemble 45 of spatio-temporal patches is shown in FIG. 7. In the case of ensembles of spatio-temporal patches, such as ensemble 45, the multiple scales of the spatio-temporal patches may be multiple space-time scales.

It will be appreciated that in order for the inference process provided by the present invention to be performed in reasonable lengths of time, information about the small patches and their relative arrangement must be efficiently stored in and extracted from the database. In accordance with a preferred embodiment of the present invention, for each small patch extracted from the examples, a descriptor vector may be computed and stored, along with the absolute coordinates of the patch (spatial or spatio-temporal coordinates). Thus, the relative arrangement of all patches in the image/video database may be implicitly available. The inference algorithm provided by the present invention may then take an ensemble of patches from the query (e.g., ensemble of patches 40) and search the database for a similar configuration of patches (both in the descriptors and in their relative geometric arrangement). To allow for fast search and retrieval, those patches may be stored in a multi-scale data structure.

The patch descriptors may be any suitable local patch descriptor. Typically, they depend on the signal and the application but do not need to be complicated. For example, for images, a SIFT-like patch descriptor (as described in the article D. Lowe. Distinctive image features from scale-invariant key points. *IJCV*, 60(2):91-110, 2004) may be computed for each patch. For audio signals, the descriptor may be a time-frame descriptor. A suitable time-frame descriptor may use mel-cepstrum features. Other types of descriptors may include color, grey levels, normalized color, normalized grey levels, gradient information, normalized gradient information, flow fields, normal flows, motion information, motion parameters, time derivatives, normalized time derivatives, histogram information and moment information, shape-context descriptors (described in S. Belongi et al. Matching Shapes. In *ICCV*, July 2001), self-similarity descriptors (described in Shechtman, at al. Matching Local Self-Similarities across Images and Videos, *IEEE Conference on Computer Vision and Pattern Recognition* 2007 (*CVPR* '07)).

Figure 8:
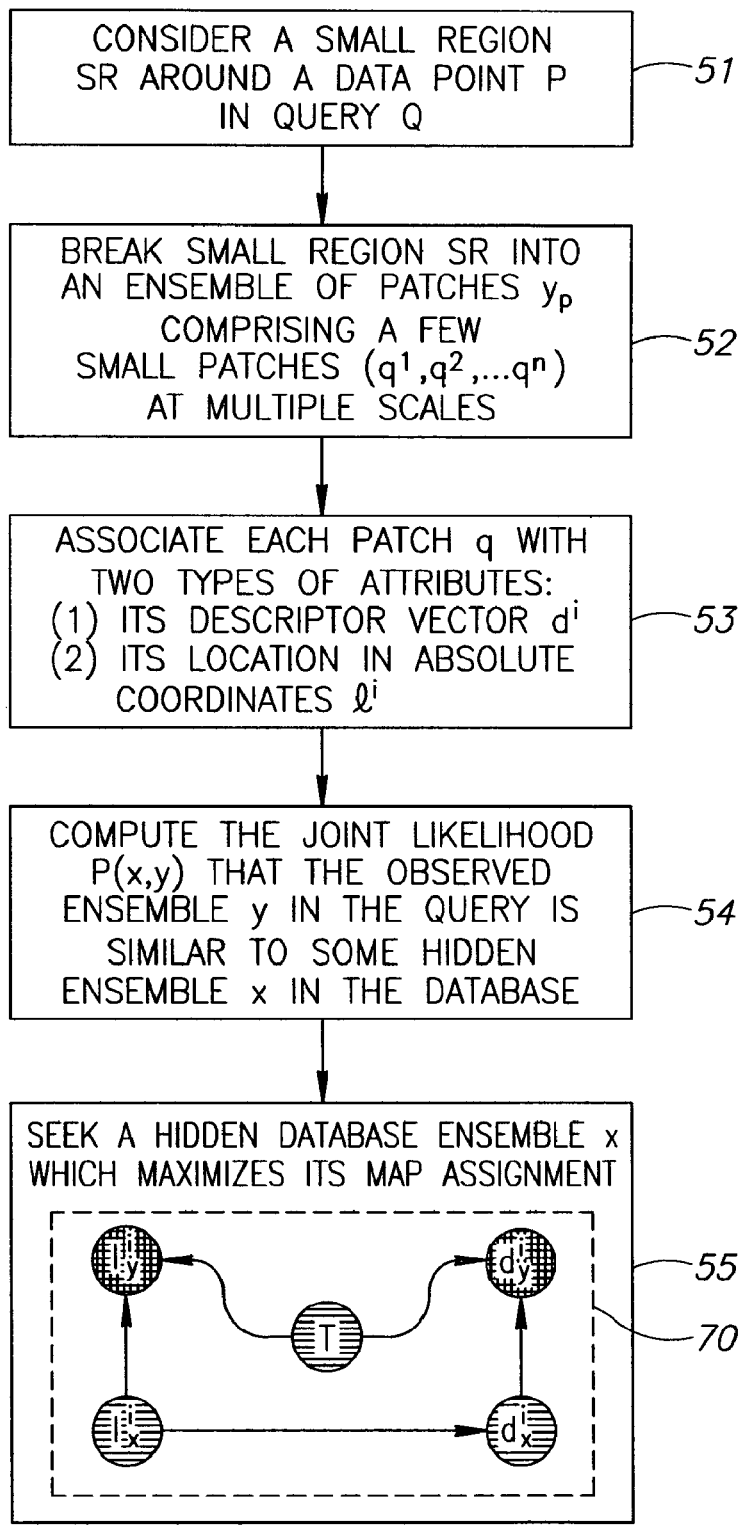
FIG. 8 is a flow chart illustration of the method steps performed by the regional similarity detector of FIG. 3.

FIG. 8 is a flow chart illustration of the method steps of the inference process provided by the present invention. In the first method step, step 51, as described previously with respect to FIG. 3, a region LR surrounding an individual data point may be considered. In the second method step, step 52, also described previously with respect to FIG. 3, small region SR may be broken down into a representative ensemble of patches $(q^1, q^2, \ldots q^n)$ (FIG. 4) comprising a few small patches at multiple scales. In the third method step, step 53, each patch q may be associated with two types of attributes.

One type of attribute may be a descriptor vector $d^i$, and the second type of attribute may be a location in absolute coordinates $l^i$. The location may be in space (e.g., images), space-time (e.g., video), 3D space (e.g., volumetric data, 3D data), time (e.g., voice, E.K.G., etc.) or 3D space+time (e.g., fMRI).

In the fourth method step, step 54, regional similarity detector 12 may compute the joint likelihood P(x,y) that ensemble y, an exemplary ensemble of patches within query Q, is similar to some hidden ensemble x in the database. This similarity requirement applies to both attribute types of the patches in ensembles x and y. That is, for ensembles x and y to be similar, both the descriptor values d and the relative positions of the patches in ensembles x and y must be similar.

Applicants have realized that the joint likelihood P(x,y) may be factored as:

$$P(x,y)=P(y|x)P(x)$$

where the modeling of P(y|x) resembles the probabilistic modeling of the "star graph" taught by Felzenszwalb et al in the article P. Felzenszwalb and D. Huttenlocher (Pictorial structures for object recognition. *IJCV*, 61(1):55-79, 2005). However, Felzenszwalb et al. computes P(y;θ) in a class-based setting, where θ is a pre-learned set of parameters of a given patch-constellation of an object-class. In the present invention, on the other hand, there is no notion of objects, i.e., there is no prior parametric modeling of the database ensemble x. Thus, θ is undefined, and P(x) is estimated non-parametrically directly from the database of examples.

To this end, the descriptor vector of the i-th observed patch in y may be denoted $d_y^i$, and its location (in absolute coordinates) may be denoted $l_y^i$. Similarly, the descriptor vector of the i-th hidden (database) patch in x may be denoted $d_x^i$, and its location may be denoted $l_x^i$. The transformation between the hidden ensemble to the observed ensemble may be denoted T. Applicants have realized that the following equation (Eq. (1)) may then be used to describe the similarity between any such pair of ensembles y and x:

$$P(x,y,T)=P(T, d_x^1, \ldots, l_x^1, \ldots, d_y^1, \ldots, l_y^1, \ldots) \qquad (\text{Eq. 1})$$

Several simplifying statistical assumptions make the computation of the likelihood in Eq. (1) more tractable. Firstly, a standard Markovian assumption, such as taught by Freeman et al. ("Learning low-level vision", *IJCV* 2000), is made, wherein for a hidden database patch and its descriptor $d_x^i$, the corresponding observed descriptor is assumed to be independent of the other patch descriptors. It will be appreciated that while this assumption is not valid in the case of overlapping patches, it is still useful in practice. The similarity between descriptors may then be modeled as provided in the following equation (Eq. (2)):

$$P(d_y^i|d_x^i,T)=\alpha_1 \text{sim}(d_y^i, T(d_x^i)) \qquad (\text{Eq. 2})$$

where sim is the general similarity function and $\alpha_1$ is a normalization constant dependent on sim. $T(d_x^i)$ is the descriptor $d_x^i$ after applying transformation T on it (Note that if transformation T is only a displacement then $T(d_x^i)=d_x^i$). The similarity function can be defined using a dissimilarity (e.g. distance) function in the form of the following equation (Eq. (3)):

$$\text{sim}(d_y, d_x)=\exp^{-dis(d_y,d_x)} \qquad (\text{Eq. 3})$$

A common dissimilarity function is the weighted $L^2$ distance (Eq. (4)):

$$\text{dis}(d_y^i, d_x^i)=(d_y^i - d_x^i)^T S_D^{-1}(d^i - d_x^i) \qquad (\text{Eq. 4})$$

In this case, the resulting distribution is Gaussian where $S_D$ is a constant covariance matrix, which determines the allowable deviation in the descriptor values. Given the location of the hidden database patch $l_x^i$ and the transformation T, the location of the corresponding observed patch $l_y^i$ is assumed to be independent of all other patch locations. This assumption enables the comparison of the geometric arrangements of two ensembles of patches with enough flexibility to accommodate for small changes in viewing angle, scale, pose and behavior, the significance of which was discussed previously with respect to FIGS. 4 and 5. Thus, as expressed in the following equation (Eq. (5)):

$$P(l_y^i|l_x^i,T)=\alpha_2 \cdot$$

$$\exp[-(l_y^i-T(l_x^i))^T S_L^{-1}(l_y^i-T(l_x^i))] \qquad (\text{Eq. 5})$$

where $\alpha_2$ is a constant, and $S_L$ is a constant covariance matrix, which captures the allowed deviations in the relative patch locations. (In this variation, the dependency in locations is modeled using a Gaussian; however the model is not restricted to this particular approach.)

Other similarity and dissimilarity measures may also be used, including: sum-of-differences, sum-of-squared differences, sum-of-absolute-differences, Lp-norms, where p is an integer, mutual information, correlation, normalized correlation, robust measures, histogram comparison measures and motion consistency measures.

Subsequent to the above described modeling of the relations between attributes across ensembles, (descriptors: $d_y^i$, $d_x^i$, and locations: $l_y^i$, $T(l_x^i)$), the relations with the hidden ensemble remain to be modeled. Specifically, the relations between a patch descriptor $d_x^i$ to its location $l_x^i$ remain to be modeled.

In the general case, this relation is highly non-parametric, and hence cannot be modeled analytically (in contrast to the class-based approaches as in Fergus et al. and Felzenszwalb et al.). Applicants have realized that it may, however, be modeled non-parametrically using examples from the database, as expressed in the following equation (Eq. (6)):

$$P(d_x | l_x) = \begin{cases} 1 & (d_x, l_x) \in DB \\ 0 & \text{otherwise} \end{cases} \qquad (\text{Eq. 6})$$

where $d_x$ and $l_x$ are an arbitrary descriptor and location.

It may then be assumed that a uniform prior distribution for transformation T may be used, i.e., it may be assumed that there is no prior preference for the transformation of the ensemble in the database to the query. The relationship among all of the above-mentioned variables is illustrated in the Bayesian network shown in diagram 70 in FIG. 8, which is discussed in greater detail hereinbelow with respect to method step 55 of FIG. 8.

Thus, Applicants have realized that for an observed ensemble y and a hidden database ensemble x, the joint likelihood P(x,y) of Eq. (1) may be factored using Eqs. (2, 5 and 6) as expressed in the following equation (Eq. (7)):

$$P(T, d_x^1, \ldots, l_x^1, \ldots, d_y^1, \ldots, l_y^1, \ldots) = \qquad (\text{Eq. 7})$$
$$\alpha P(T) \prod_i P(l_y^i | l_x^i, T) P(d_y^i | d_x^i, T) P(d_x^i | l_x^i)$$

Returning now to FIG. 8, in accordance with the fifth method step 55 of the present invention, step 55, similarity detector 12 may then seek, for a given observed ensemble, (e.g., ensemble $y_{Pk}$ in FIG. 3) a hidden database ensemble which maximizes its MAP (maximum a-posterior probability) assignment. This may be done using the statistical model described hereinabove, which has a simple and exact Viterbi algorithm. According to Eq. (7) the MAP assignment can be written as:

$$\max P(T, d_x^1, \ldots, l_x^1, \ldots, d_y^1, \ldots, l_y^1, \ldots) =$$

$$\alpha \max_T P(T) \prod_i \max_{l_x^i} P(l_y^i \mid l_x^i, T) \max_{d_x^i} P(d_y^i \mid d_x^i, T) P(d_x^i \mid l_x^i)$$

Applicants have realized that this expression may be phrased as a message passing (Belief Propagation, as in Yedidia et al. Understanding belief propagation and its generalizations, pages 239-269, 2003) algorithm for a probabilistic graphical model, which is shown in diagram 70 in FIG. 8. In diagram 70, observed variables $l_y^i$ and $d_y^i$ are marked with a grid like hatching pattern, while hidden variables T, $l_x^i$ and $d_x^i$ are marked by a horizontal hatching pattern. First the message $m_{dl}^i$ passed from node $d_x^i$ to node $l_x^i$ and T regarding its belief in the location $l_x^i$: and transformation T:$m_{dl}^i(l_x^i,T)$ is computed for each patch, that is, $$\max_{d_x^i} P(d_y^i \mid d_x^i, T) P(d_x^i \mid l_x^i).$$

Specifically, for each observed patch, all the candidate database locations $l_x^i$ with high descriptor similarity using transformation T are computed. Next, for each of these candidate database locations and transformation, a message is passed about the induced possible transformation T from the database:

$$m_{lT}^i(T) = \max_{l_x^i} P(l_y^i \mid l_x^i, T) m_{dl}^i(l_x^i, T).$$

At this point, a candidate list of transformations suggested by each individual patch is accrued. The likelihood of an entire ensemble assignment may then be computed by multiplying the beliefs from all the individual patches in the ensemble:

$$m_e(T) = P(T) \prod_i m_{lT}^i(T).$$

Applicants have realized that a naïve implementation of the above message passing algorithm may be very inefficient, since independent descriptor queries are performed for each patch in the observation ensemble, regardless of answers to previous queries performed by other patches. However, these patches are related by a certain geometric arrangement. Applicants have realized that this knowledge may be used to perform a more efficient search by progressive elimination of the search space in the database.

In accordance with the progressive elimination process provided in the present invention, the message $m_{dl}^i$ for a small number of patches (e.g., 1) may be computed. The resulting list of possible candidate origins may then induce a very restricted search space for the next patch. The next patch, in turn, may eliminate additional origins from the already short list of candidates, etc. Applicants have further realized that truncated Gaussian distributions (e.g., truncated after $4\sigma$) may be used in order to speed-up the progressive elimination process.

Figure 9:
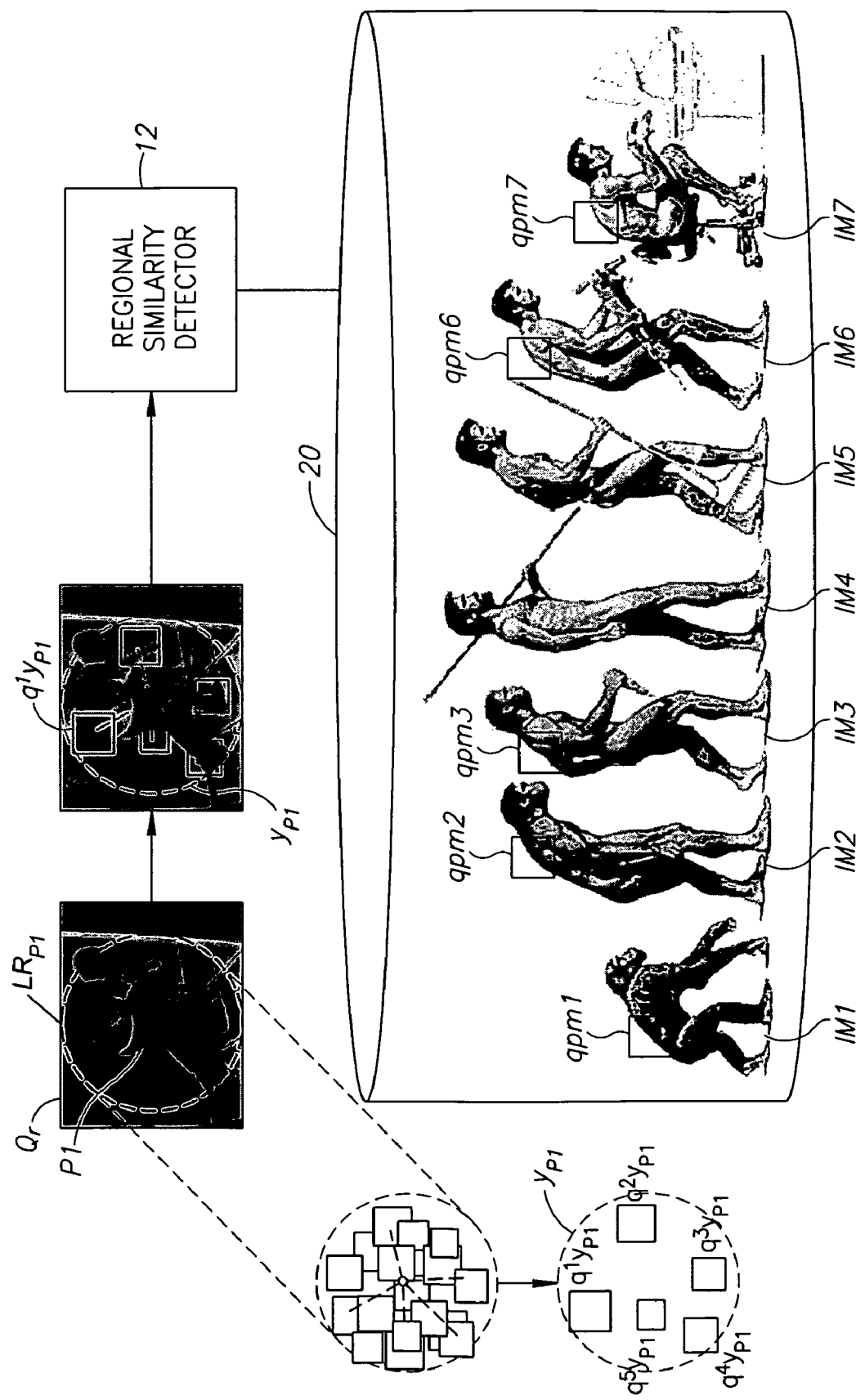
FIG. 9 is an illustration of a progressive elimination process performed by the regional similarity detector of FIG. 3.

The progressive elimination process provided by the present invention is illustrated in FIG. 9, reference to which is now made. In the example shown in FIG. 9, regional similarity detector 12 is shown to conduct a search in database 20 for a hidden ensemble of patches $X_{P1}$ which may be a substantial match for ensemble of patches $y_{P1}$, which is shown in FIG. 9 to be the simplified schematic ensemble of patches representing large region $LR_{P1}$ in query Qr. As shown in FIG. 9, region $LR_{P1}$ is centered about query data point P1. Ensemble of patches $y_{P1}$ is shown in FIG. 9 to comprise component patches $q^1y_{P1}$, $q^2y_{P1}$, $q^3y_{P1}$, $q^4y_{P1}$, and $q^5y_{P1}$.

In accordance with the progressive elimination process provided in the present invention, the search illustrated in FIG. 9 may begin with a search for a match for a single patch in query ensemble $y_{P1}$. The exemplary search illustrated in FIG. 9 is shown to begin with a search for a match for patch $q^1y_{P1}$. It may be seen in FIG. 9 that this search yields matching patches qpm1, gpm2, qpm3, qpm6 and qpm7, in images IM1, IM2, IM3, IM6 and IM7 respectively, of database 20. It will be appreciated, as shown in FIG. 9, that images IM4 and IM5 are eliminated from the search space (for database ensemble $x_{P1}$ in database 20) in the search for a match for the first patch, patch $q^1y_{P1}$, since similarity detector 12 failed to find a match for patch $q^1y_{P1}$ of query ensemble $y_{P1}$ in these two images. They are thus eliminated from the group of images which are candidates for containing an ensemble of patches $x_{P1}$ to match query ensemble of patches $y_{P1}$.

The method of FIG. 8 may generate candidates $b_j$, where each candidate $b_j$ may be similar to patch $q^1yp_1$ through transform T. Transform T may be any type of transformation, such as an identity transformation (i.e. no change), a translation, a rigid transformation, a non-rigid transformation, a rotation, a reflection, scaling, an affine transformation or a projective transformation.

Figure 10:
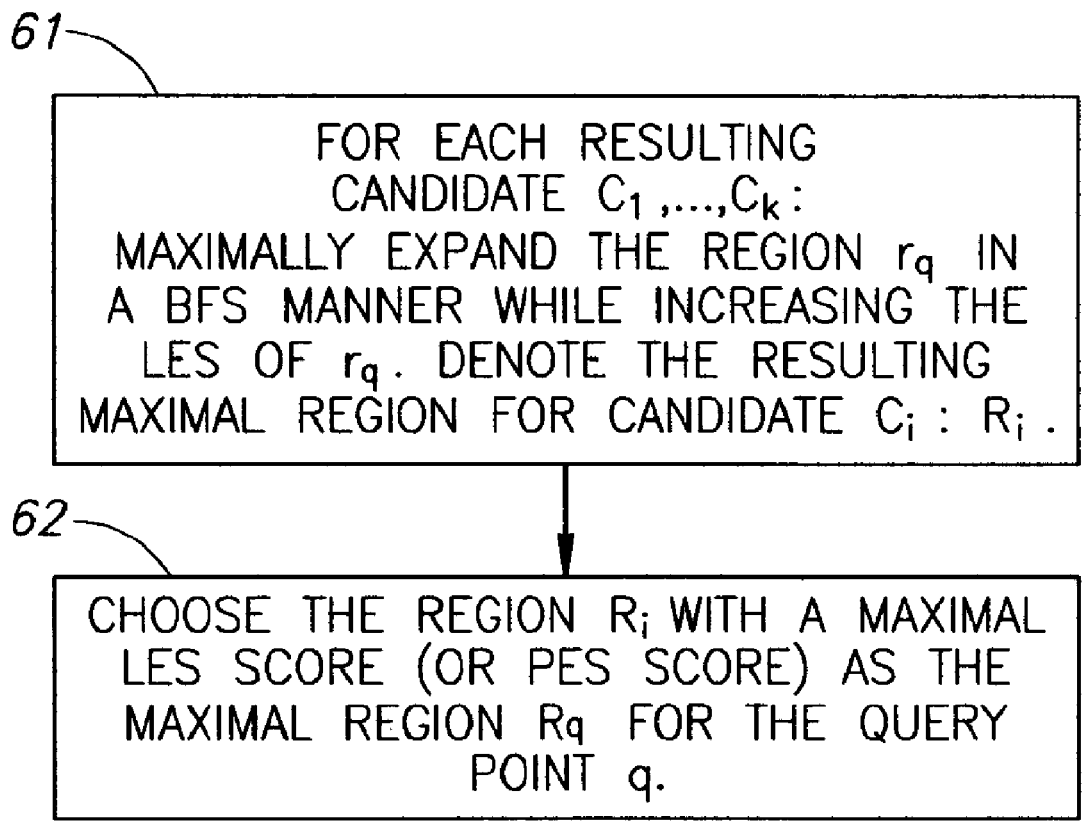
FIG. 10 is a pseudo-code illustration of a method of finding matching regions, used by regional similarity detector of FIG. 3.

In accordance with a preferred embodiment of the present invention, and as shown in FIG. 10 to which reference is now made, for each candidate $b_j$, regional similarity detector 12 may expand (step 60) region $r_q$ in a BFS (breadth first search) order, as described in "Introduction to Algorithms" by T. H. Corman, C. E. Leiserson and R. L. Rivest (MIT Press and McGraw-Hill 1994). A BFS search checks all possible directions in a graph for a solution to a problem. In accordance with a preferred embodiment of the present invention, regional similarity detector 12 may check all points around candidate $b_j$ and may select the point that may increase a local evidence score (LES) of region $r_q$. Detector 12 may continue to add pixels to region $r_q$ as long as the LES continues to increase. Detector 12 may denote the resulting maximal region for candidate $b_j$ by $R_j$.

The local evidence score (LES) may compare the likelihood that region R was generated by the selected pixels from database 20, here denoted REF, versus the likelihood that region $r_q$ was generated by some random process. The higher the likelihood, the larger LES may be.

LES may be defined as:

$$LES(R \mid H_{ref}) = \log_2(LR(R)) \quad \text{(Eq. 8)}$$

$$LR(R) = \frac{P(R \mid H_{ref})}{P(R \mid H_0)} = \frac{\sum_T P(R \mid T, H_{ref}) P(T \mid H_{ref})}{P(R \mid H_0)}$$

where $H_{ref}$ may be the hypothesis that region R (which may be small region $r_q$ or candidate $R_j$ or the final region R) was "generated" by reference REF, $H_0$ may be the hypothesis that region R was generated by a random process, or by any other application-dependent PDF (probability density function) ($H_0$ may be referred to as the "null hypothesis"), and T may be a transformation of a region of REF, possibly followed by some small local distortions, which may generate region R. Transformation T may account for shifts, scaling, rotations, etc. In the simplest case (i.e. only shifts), T may be the corresponding location in reference REF.

$P(T|H_{ref})$ may be the prior probability on the global transformations T (shifts, scaling, rotations), and $P(R|T,H_{ref})$ may be the likelihood that region R was generated from reference REF at that location, scale, etc. (up to some local distortions which may also be modeled by $P(R|T,H_{ref})$, as discussed hereinbelow. If there are multiple corresponding regions in reference REF, (i.e., multiple transformations T), all of them may contribute to the estimation of LR(R).

It will be appreciated that the higher the local evidence score LES is, the smaller the probability that region R was randomly generated. High LES therefore provides higher statistical evidence that region R was generated from reference REF. It will also be appreciated that the larger the region R is, the higher its evidence score $LES(R|H_{ref})$ may be. This may provide higher statistical evidence to the hypothesis that R was composed from reference REF. For example, assume for simplicity that region R has a single identical copy in reference REF, and that the transformations T are restricted to shifts with uniform probability (i.e., $P(T|H_{ref})$=const), then $P(R|H_{ref})$ is constant, regardless of the size of region R. On the other hand, $P(R|H_0)$ decreases exponentially with the size of region R. Therefore, the likelihood ratio increases and so does its evidence score LES.

Local evidence score LES may also be interpreted as the number of bits saved by describing the region R of the query using reference REF, instead of describing it using the null hypothesis $H_0$. Given that the optimal average code length of a random variable y with probability function P(y) is length (y)=−log(P(y)), then local evidence score LES may be written as $LES(R|H_{ref})$=length($R|H_0$)−length($R|H_{REF}$). Therefore, larger regions provide higher saving (in bits) in the description length of region R.

A region R may induce an "average savings per point" for every point q in the region, which may be defined as:

$$Avg = \frac{LES(R|H_{ref})}{|R|} \quad \text{(Eq. 9)}$$

where |R| is the number of points in region R. However, a point q may also be contained in other regions generated from reference REF, each with its own local evidence score. Thus, there may be a maximal possible savings per point PES, defined as:

$$PES(q:H_{ref}) = \max_{R, s.t. q \in R} \frac{LES(R|H_{ref})}{|R|} \quad \text{(Eq. 10)}$$

One embodiment for the calculation of the likelihood of an expanded region $r_q$, given a global transformation T (e.g., a location in reference REF) and local patch displacements $\Delta l_i$ for each patch i in R (i=1, 2, ..., R), is captured by the following expression:

$$P(R|T, \{\Delta l_i\}, H_{ref}) = 1/Z \prod_i e^{-\frac{|\Delta d_i|^2}{2\sigma_1^2}} e^{-\frac{|\Delta l_i|^2}{2\sigma_2^2}} \quad \text{(Eq. 11)}$$

where $\{\Delta d_i\}$ are the descriptor distortions of each patch, and Z is a normalization factor.

In one embodiment, regional similarity detector 12 may solve equation 11 by marginalizing, or summing over, over all possible local displacements $\{\Delta l_i\}$ within a predefined limited radius, such as 20 pixels radius in an image. Regional similarity detector 12 may then compute local evidence score LES in Eq. (9), by marginalizing over all possible global transformations T. In one embodiment, regional similarity detector 12 may assume only global shifts and may assume uniform distributions over all shifts, i.e., P(T|Href)=1/|REF|. However, detector 12 may accommodate more complex global transformations.

Once regional similarity detector 12 may find all candidate regions $R_j$ and their local evidence scores $LES_j$, then detector 12 may select (step 62) the region R with the maximal local evidence score LES or maximal possible savings per point PES as the maximal region $R_q$ for the current query point q.

In practice, a region found maximal for one point is likely to be the maximal region for many other points. For example, if a region $R_k$ contains X points, it is likely that region $R_k$ is the maximal region for all X points. Thus, the number of different maximal regions in query Q will tend to be significantly smaller than the number of points in query Q.

Figure 11:
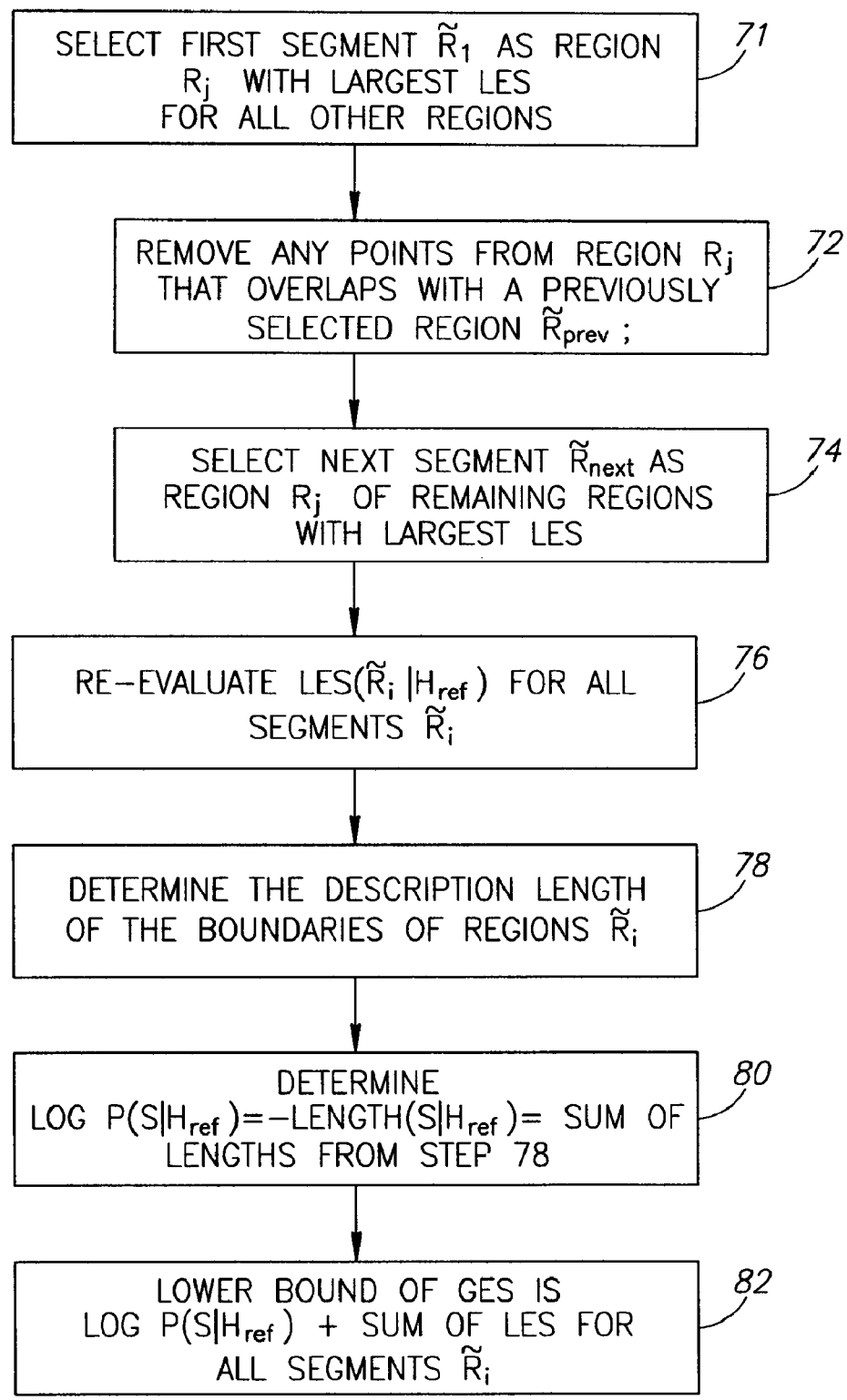
FIG. 11 is a pseudo-code illustration of a method for finding a global similarity value, used by a global similarity calculator of FIG. 1.

Regional similarity detector 12 may generate the regions $R_j$ that were found to have similar regions in the reference signal REF or REF. Global similarity calculator 14 (FIG. 1) may compute the extent of global similarity between input signal Q and reference signal REF from similar regions $R_j$. FIG. 11, to which reference is now made, illustrates the method performed by calculator 14 (FIG. 1).

The global similarity may be defined from an accumulation of multiple local pieces of evidence $R_j$ and from $R_0$ which defines the remainder of the signal for which no similar regions have been found. $S=\{R_0, R_1, \ldots, R_k\}$ may be a segmentation or division of query signal Q. Assuming that remainder $R_0$ was generated by the null hypothesis $H_0$, Equation 11 may provide a global evidence score GES:

$$GES(Q|H_{ref}, S) = \log \frac{P(Q|H_{ref}, S)}{P(Q|H_0)} = \quad \text{(Eq. 12)}$$

$$\log \frac{P(R_0|H_0) \prod_{i=1}^{k} P(R_i|H_{ref})}{\prod_{i=0}^{k} P(R_i|H_0)} = \sum_{i=1}^{k} LES(R_i|H_{ref})$$

where, for simplicity of notation, the symbol H also denotes the global hypothesis Eq. 12 states that the global evidence induced by segmentation S may be the accumulated sum of the local evidences provided by the individual segments of S. Thus, global similarity calculator 14 may accumulate local evidence of non-overlapping regions within query Q which have similar regions in reference REF in order to obtain global evidence on the hypothesis that query Q was generated from reference REF.

Eq. 12 assumes segmentation S to be given. In order to obtain global evidence score GES of Q, equation 12 marginalizes over all possible segmentations S of query Q:

$$GES(Q \mid H_{ref}) = \quad \text{(Eq. 13)}$$

$$\log \frac{P(Q \mid H_{ref})}{P(Q \mid H_0)} = \log \sum_S \frac{P(Q \mid H_{ref}, S) P(S \mid H_{ref})}{P(Q \mid H_0)} =$$

$$\log \sum_S P(S \mid H_{ref}) \frac{P(Q \mid H_{ref}, S)}{P(Q \mid H_0)}$$

Global similarity calculator 14 may determine lower and upper bounds LB and UB of $GES(Q|H_{ref})$ from regions $R_j$ from similarity detector 12, rather than attempt to sum over all possible segmentations of the query Q. Lower bound LB on global evidence score GES may be:

$$LB = \max_S \left\{ \log P(S \mid H_{ref}) + \sum_{R_i \in S} LES(R_i \mid H_{ref}) \right\} \quad \text{(Eq. 14)}$$

where $\log P(S|H_{ref})$ may be estimated by $-\text{length } (S|H_{ref})$, the description length of the boundaries of the individual regions within S. An upper bound UB on global evidence score GES may be:

$$UB = \sum_{q \in Q} PES(q \mid H_{ref}) \quad \text{(Eq. 15)}$$

The method for calculating the lower bound is shown in FIG. 11, to which reference is now made.

Calculator 14 may select (step 71) a first segment $\tilde{R}_1$ of a sub-optimal segmentation S' to be the maximal region with the largest evidence score, or $\tilde{R}_1 = \arg \max_R LES(R_i|H_{ref})$. Calculator 14 may select (step 74) a next segment $\tilde{R}_{next}$ to be the largest of all the remaining regions after having removed (step 72) their overlap with previously selected regions $\tilde{R}_1$, etc. This process yields a segmentation of query Q as S= $\{\tilde{R}_1, \ldots, \tilde{R}_l\}$ (l<k). Due to the overlap removal, calculator 14 may re-evaluate (step 76) the evidence scores of the regions, to generate $LES(\tilde{R}_i|H_{ref})$ for each new region $\tilde{R}_i$.

To determine lower bound LB, calculator 14 may determine (step 78) the description length of the boundaries of regions $\tilde{R}_l$ and, in step 80, may determine $\log P(S|H_{ref})$ from their sum. In step 82, calculator 14 may determine the lower bound of GES as the sum of the output of step 80 and the sum of LES for all segments $\tilde{R}_l$ (i.e. the outputs of step 76).

Global similarity calculator 14 may alternatively, or in addition, calculate upper bound UB for global evidence score $GES(Q|H_{ref})$. To do so, calculator 14 may sum the maximal point-wise evidence scores $PES(q|H_{ref})$ from all points in Q. Note that the upper bound is computed by determining the maximal evidence regions that pass through every point in the query.

The output of global similarity calculator 14, the lower and/or upper bound for global evidence score $GES(Q|H_{ref})$, may be applied between individual signals, and/or between groups of signals (by setting query Q and reference REF accordingly). As discussed hereinabove, it may be employed in machine learning tasks such as retrieval, classification, recognition, and/or clustering.

Local evidence score $LES(R|H_{ref})$, provided by regional similarity detector 12, may be used for local inference problems, such as local labeling of a new query based on previously labeled data, local classification, etc.

As discussed hereinabove, both measures may be applied between different portions of the same signal (e.g., by setting query Q to be one part of signal, and reference REF to be the rest of the signal). Such intra-signal similarity may be used for inference tasks like segmentation, while the absence of intra-signal similarity (local dissimilarity) may be used for detecting saliency/irregularities.

Figure 12:
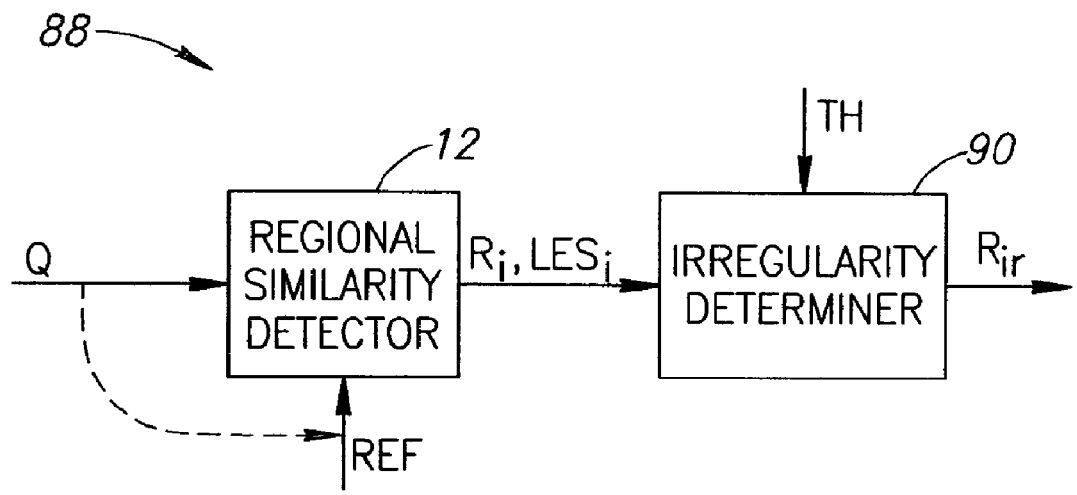
FIGS. 12 and 13 are block diagram illustrations of applications utilizing the regional similarity detector of FIG. 3.

Reference is now made to FIG. 12, which illustrates a saliency detector 88. In this embodiment, detector 12 may provide its output to an irregularity determiner 90 which may infer whether there are any irregularities in query Q.

Determiner 90 may define a point q in query Q to be irregular if its best local evidence score $LES(R_q|H_{ref})$ may be below a threshold TH. Thus, determiner 90 may compare each local evidence score against threshold TH, which might be defined empirically. For example, it might be defined to minimize the number of false alarms per hour. Determiner 90 may produce a list of irregular regions $R_{ir}$ whose local evidence score is below threshold TH.

As has been discussed hereinabove, irregularities may be inferred either relative to a database of examples, or relative to the signal itself. In one example, saliency detector 88 received a single image as a "reference" of good quality grapefruits. A multiplicity of query images were provided to detector 12, which tried to compose the query images from the largest possible pieces of the reference image. Irregularity determiner 90 identified the regions in the input query Q with low local evidence score LES (i.e., small maximal regions) and these corresponded to defects in the fruit.

Determiner 90 may be operative for automatic defect inspection, such as for integrated circuits, PCBs and manufactured goods.

As mentioned hereinabove, local saliency within query signal Q may be measured relative to other portions of query signal Q, e.g., by trying to compose each region in query Q using pieces from the rest of query Q. Regional similarity detector 12 may determine intra-signal evidence scores LES relative to non-neighboring parts of the image. Irregularity determiner 90 may detect regions with low intra-signal evidence as salient. Saliency detector 88 may be utilized to detect defects in items which are normally consistent, such as fabric, or to determine when something abnormal happens in a scene. The latter may be useful in suspicious behavior detection, which may review the output of surveillance cameras and may provide an alarm of some kind when something abnormal happens. Saliency detector 88 may prioritize the channels of a multiple camera system according to the computed degree of suspicious behavior, selecting those currently viewing suspicious behavior.

Figure 13:
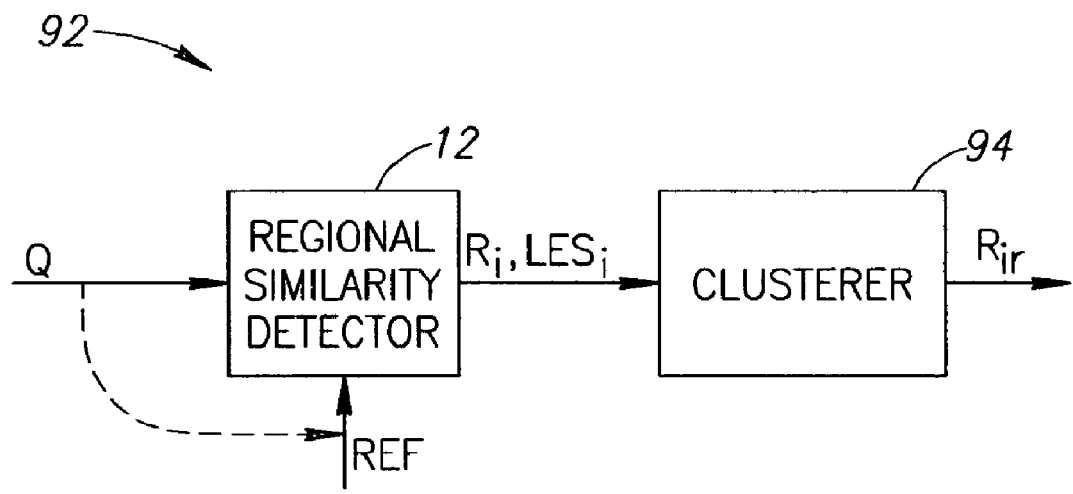

Reference is now made to FIG. 13, which illustrates a signal segmenter 92. Segmenter 92 may comprise regional similarity detector 12 and a clusterer 94. Applicants have realized that every maximal region may provide evidence to the fact that all points within the region should be clustered/segmented together. Thus, clusterer 94 may add the value of $LES(R_q|H_{ref})$, for each point q in query Q, to all entries (i, j) in an affinity matrix $\forall q_i, \forall q_j \in R_q$ and then may apply spectral clustering to the affinity matrix. An exemplary spectral clustering method may be found in the article by J. Shi et al. (Normalized cuts and image segmentation. In CVPR'97, pages 731-737, 1997). Because clusterer 94 may utilize the local evidence scores, spectral clusterer 94 may cluster together large regions of query Q which appear also in REF.

Similarity determiner 10 may be utilized for signal classification. In one embodiment, an action video may be presented as query Q and may be compared to a database of action videos. Global similarity calculator 14 may determine how similar each action video of database 20 is to query action video Q and may select the action video for which the global evidence score GES is the largest.

In one example, action videos of several people who appear simultaneously in the field of view, with partial occlusions, some differences in scale, and complex backgrounds, where utilized. Similarity determiner 10 correctly classified the actions of each person. For this example, 3D space-time video regions were broken into small spatio-temporal video patches (of 7×7×4 pixels). The descriptor for each patch was a vector containing the absolute values of the temporal derivatives in all pixels of the patch, normalized to a unit length. Since stationary backgrounds have zero temporal derivatives, this was not sensitive to the background, nor did it require foreground/background separation.

In a further example, similarity determiner 10 was utilized to recognize speakers. 31 speakers (male and female) provided three repetitions of a five-word sentence (2-3 seconds long) in a foreign language, recorded over a phone line. Different repetitions by the same person slightly varied from one another. Altogether the database contained 93 samples of the sentence. The patch descriptors were standard mel-frequency cepstrum frame descriptors for time-frames of 25 msec, with overlaps of 50%.

Global similarity calculator 14 calculated the global evidence score GES for each for each sample vs. the remaining samples and selected the sentence which was the most similar. It recognized the right speaker 90 out of 93 cases (i.e., 97% correct recognition).

It will be appreciated that similarity determiner 10 may be used to retrieve images (or signals) from a database which are similar to a query. This may be useful for images and video libraries.

It will be appreciated that similarity determiner 10 may be utilized to determine similarity relative to the past or present, similarity relative to other portions of the sequence, similarity relative to several external references, or relative to images of objects or actions (the latter is useful for detecting visually similar/dissimilar objects/actions), or a combination of the similarity measurements above.

Applicants have realized that it is possible to create associations (or links) between points q in query Q and points in the associated regions R of reference REF. In one embodiment, the strength of these associations may be listed as well, where the strength may be defined by the associated local evidence score LES for the point Reference is now made to FIG. 14, which illustrates such associations.

Figure 14:
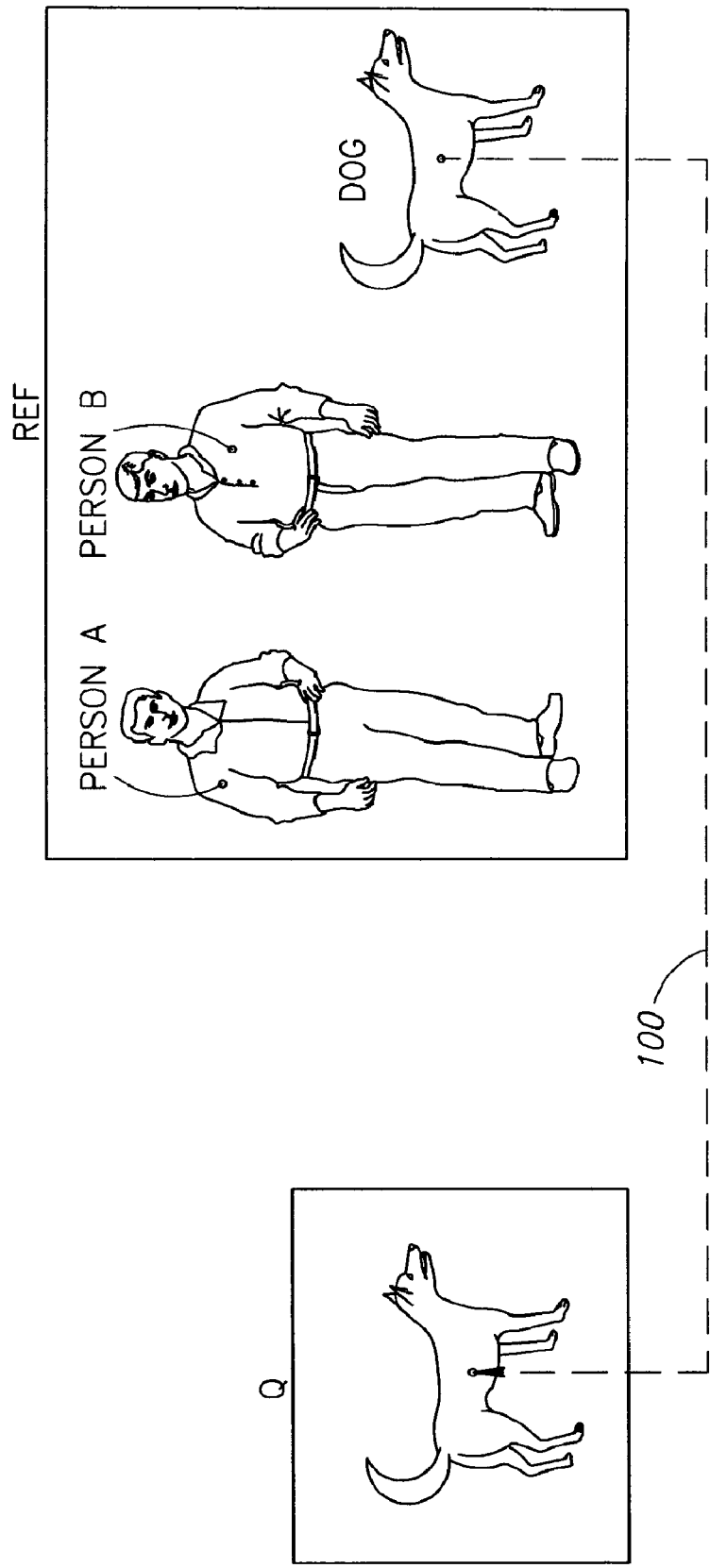
FIG. 14 is a schematic illustration of label inheritance between images, useful in understanding an application of the present invention.

FIG. 14 shows query image Q, of an animal, and reference image REF, of two people and a dog. The points of reference image REF have labels associated with them. For example, a point in one of the people is labeled "Person A", a point in the other person is labeled "Person B" and a point in the dog is labeled "Dog". Regional similarity detector 12 may determine that the animal (or parts of it) of query Q may be similar to the animal (or parts of it) of reference image REF. In this embodiment, the label "Dog" from reference image REF may be passed back (as per arrow 100) to the animal of query Q. In this manner, regions R of query Q may "inherit" labels from the regions to which they are similar. If desired, local evidence score LES may also be maintained per point, which may provide an indication of the strength of the association.

The labels (or markings) may contain various types of information, such as annotations, web-links, drawings, hyper-links, comments, graphical signs, xml data (and other markup language data), commercials, advertisements, news, relevant tasks, appointments, events, references/citations, talkbacks, contact information, financial darn, blogs, newsgroup links, RSS links, bookmarks services, email information and highlights.

Figure 15:
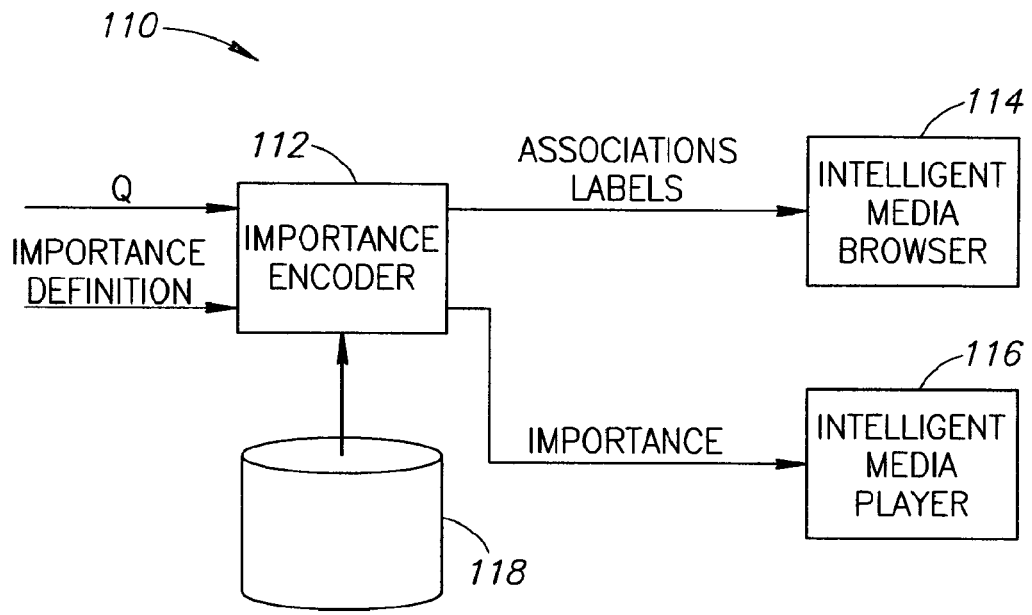
FIG. 15 is a block diagram illustration of an intelligent media explorer, constructed and operative in accordance with a preferred embodiment of the present invention.

Reference is now made to FIG. 15, which illustrates an intelligent media explorer 110, which utilizes the concepts and elements described hereinabove to navigate and browse through large amounts of data, such as video sequences and large digital libraries, in a relatively efficient and relatively intelligent way.

Applicants have realized that intelligent exploration of data may be possible by defining "importance" (i.e. relevance) to the user/viewer. By computing the "importance score" in every point in the data, the intelligent media explorer 110 may facilitate navigation to and extraction of important parts from it.

Media explorer 110 may comprise an importance encoder 112, an intelligent media browser 114 and an intelligent media player 116. Encoder 112 may mark regions of an input signal Q as to their importance score. The importance score may be defined as similarity/dissimilarity to regions of a database 118. The kind of "importance" may be user defined and may depend on both the type of media to be reviewed and the particular desires of the user. For example, for playing through surveillance videos, the importance might be defined as "dissimilarity to regular actions stored in database 118", "dissimilarity to actions of the past" and "similarity to suspicious actions stored in database 118". Another useful option for surveillance oriented importance may be by similarity to scenes (e.g. using a global similarity) stored in database 118.

For moving from scene to scene in a television show and for finding high action parts of the show, the importance may be defined as "dissimilarity to recent past" and "similarity to running action stored in database 118".

Figure 16:
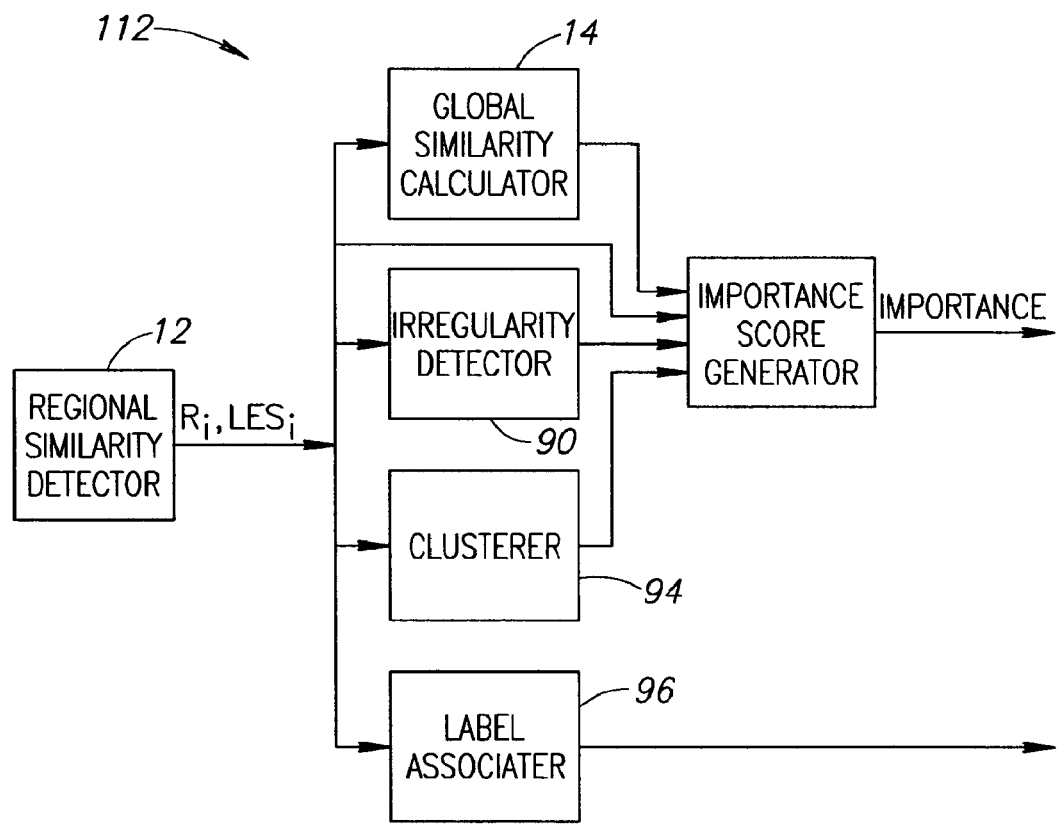
FIG. 16 is a block diagram illustration of a similarity encoder, useful in the intelligent media explorer of FIG. 15.

As shown in FIG. 16, to which reference is now briefly made, importance encoder 112 may comprise regional similarity detector 12, global similarity calculator 14, irregularity determiner 90, clusterer 94 and a label associator 96, which may perform as described with respect to FIG. 14, depending on the importance definition. For the surveillance example, importance encoder 112 may utilize regional similarity detector 12 to find the similar regions in all types of action sequences in database 118 and irregularity determiner 90 to choose only the dissimilar (salient) regions vis-à-vis the past and the regular action sequences stored in database 118. For the television show, importance encoder 112 may utilize regional similarity detector 12 to find the similar regions in the recent past and in the running sequence of database 118 and may utilize irregularity determiner 90 to choose only the dissimilar (salient) regions vis-à-vis the recent past.

For each point q in query Q, importance encoder 112 may combine the various similarity scores produced by the various elements into an importance score. Moreover, label associator 96 may generate associations between regions of query Q and regions of reference REF (for regions which are quite similar to each other) and may propagate any labels from the regions of reference REF to the associated regions of query Q. In the opposite direction, the user may label a query region in order to propagate the label information to associated regions in the reference REF. In this manner the user may efficiently label large portions of data.

Importance encoder 112 may be implemented in software, hardware or a combination of the two. It might be a real-time implementation or an offline/batch implementation, depending on the use and the size of the signals and the database being processed.

Returning to FIG. 15, intelligent media player 116 may provide a user with viewing or playing capabilities according to the importance definition. Intelligent media player 116 may use the importance score in a number of ways.

Player 116 may perform an "intelligent fast forward" by playing a video sequence with a speed proportional to the degree of importance of the data For instance, when nothing important happens, player 116 may play the sequence very fast. When the importance score is higher (i.e. more important content is detected), player 116 may play the sequence fast, but slower than before, and when something very interesting or important is detected, player 116 may play the sequence at a normal speed (or possibly even in slow motion). Thus, for the television show, player 116 may play action sequences and changes of scene at the normal speed and may speed through the rest of the show. For a recorded soccer game, the player 116 may play the sequence quickly, and slow down whenever important events (such as soccer goals, fouls, etc.) are detected. The user may resume normal speed or may return to "intelligent fast forward" mode at any time.

Player 116 may jump to the next time that it detects something important. This capability may be very important in unedited home video or surveillance video where "boring" action (i.e. ones that the user defines as unimportant) may be very long.

With the importance score of each point in each frame, player 116 may zoom in or focus on the most interesting part in the frame or where salient objects and/or actions are spotted (i.e. the region with the highest importance score). By zooming in to the interesting part of the frame, player 116 may reduce the size of the display (for instance, when converting HDTV display to regular video size, or from HSV to cellular 3G video size). However, it will be appreciated that this cropping for retargeting is not fixed; how it is cropped may depend on which part of the frame is currently most important.

The zooming in or focusing may be utilized to create a thumbnail (or image preview), based on the important regions of the image. Similarly player 116 may highlight regions of the query according to their importance.

Player 116 may extract important key frames by extracting the most important frames (as defined by a threshold on the overall importance value of the frame) in a video sequence. With this capability, player 116 may generate a still summary of a video or a "story board" (e.g., for printing purposes or for a slideshow) or a video index which is used for media navigation (as chapters in a book).

Player 116 may generate a video synopsis clip containing short clips of important sequences in the original video. This form of video summary can be used as a video preview.

Moreover, player 116 may highlight important regions (i.e. regions with high importance scores) during play, in order to draw the attention of the user when something important happens.

Intelligent media browser 114 may provide an interactive interface for the user to browse and navigate the media. Browser 114 may use the computed importance, associations and labeling on query Q to provide associative jumps and browsing capabilities.

Browser 114 may enable the user to use associative links to jump from one point in the media to other points in the media or in database 118 and to play (using media player 116) starting at the associated point. As described hereinabove, encoder 112 may associate each point in query Q with several regions in the reference data (whether external or other regions of query Q). The strength of the similarity may reflect the strength of the association. Such associative jumps may be used to explore other regions in the video, which might be interesting due to their association to an interesting region in query Q.

Browser 114 may enable access to labeling information from label associator 96. As discussed hereinabove, when a strong association is made to a reference with labeling information, label associator 96 may propagate the information to query Q. When the user chooses some point q that has a label, browser 114 may display the list of labels. This may be in the form of a tooltip or a video bubble. The user may choose to follow a label and may jump to the reference from which the label was propagated, as described hereinabove for associative jumps.

If the label is a web link, a link to an advertisement, etc., browser 114 may follow the link (and cease playing the video sequence). Because most points in query Q may not be labeled, browser 114 may signal when it comes upon a labeled point (e.g., browser 114 may display a small flashing light bulb icon at the labeled point location).

Labels may contain various types of information, such as annotations, web-links, drawings, hyper-links, comments, graphical signs, xml data (and other markup language data), commercials, advertisements, news, relevant tasks, appointments, events, references/citations, talkbacks, contact information, financial data, blogs, newsgroup links, rss links, bookmarks services, email information and highlights.

It will be appreciated that intelligent media explorer 110 may be utilized for other applications other than those described hereinabove.

For example, explorer 110 may be embedded in other applications, such as web-browsers and operating systems. For instance, other applications may utilize the zoom-in/re-targeting capability for generating a video preview in a small window.

An operating system may utilize explorer 110 to generate image thumbnails for an image directory. Explorer 110 may review the images in a directory and may generate their importance (which may be user-defined or pre-defined by the operating system). This may happen on-line or off-line. When activated, explorer 110 may circulate through the important images in the directory or navigate though "important directories" (i.e. directories with important content).

Similarly, a traditional image thumbnail might be too small to portray the entire image (such as when the image is large or on a limited display space, as in a PDA (personal digital assistant), for example). When activated, explorer 110 may zoom in or focus on the important regions in the image. In a similar fashion explorer 110 may be utilized for "video thumbnails" which features short clips from a video sequence (possibly also with focusing on important point in the frame), containing the most important part in the video.

The capability of explorer 110 to compute importance of entire media files/directories (e.g., images, video, audio or directories of digital data) may be used for ranking based on importance. For instance, a user may use explorer 110 to sort all the images and/or video sequences in a directory based on the importance of their content, as well as rank different directories based on the importance of their content. Moreover, explorer 110 may can be used to rank digital media found on the internet (e.g., as a standalone module, or as a part of an internet search engine). This capability may also be combined with existing search engines. For example, a standard search engine may be used to extract a large list of images according to key-words. Once these are available, explorer 110 may rank the images based on the importance of their content and may display the most "interesting"/"important" images first.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for determining signal similarity between a query signal and a reference signal via composition, the method comprising:
   searching said reference signal to detect at least one matching region to a region of said query signal, the shape and size of said matching region being determined as a function of a local evidence score for said region, wherein said local evidence score is a function at least of a quality of the match of said region and of its statistical significance; and
   composing at least part of said query signal from at least one said matching region
      which provides at least one of: local evidence scores and a global evidence score for said query signal;
      wherein said global evidence score defines the extent of a global similarity of said query signal to said reference signal.

2. The method according to claim 1 and also comprising at least one of the following:
   determining irregular regions as regions whose said local evidence scores are below a threshold; and
   determining saliency within said query signal at least from said local evidence scores.

3. The method according to claim 1 and also comprising at least one of the following:
   employing at least said global evidence score for clustering a multiplicity of signals;
   clustering said regions within said query signal using at least said local evidence scores; and
   segmenting said query signal using at least said local evidence scores; and
   marking regions of said query signal with markings from said regions of said reference signal using at least said local evidence scores.

4. The method according to claim 1 and also comprising marking regions of said query signal with markings from said regions of said reference signal using at least said local evidence scores, where said markings comprise at least one of: labels, annotations, web-links, drawings, hyper-links, comments, graphical signs, XML data, markup language data, commercials advertisements, news, relevant tasks, appointments, events, references, citations, talkbacks, contact information, financial data, blogs, newsgroup links, RSS links, bookmarks services, email information, and highlights.

5. The method according to claim 1 and also comprising classifying items in at least portions of said query signal from at least said global evidence scores wherein said items are objects when said query signal is at least one of: an image and a video sequence, said items are actions when said query signal is a video sequence and said items are speech when said query signal is an audio signal.

6. The method according to claim 1 and also comprising recognizing items in said query signal as items in said reference signal using at least said global evidence scores, wherein said items are objects when said query signal is an image, said items are speech when said query signal is an audio signal and said items are speakers when said query signal is an audio signal.

7. The method according to claim 1 and wherein said signals are at least one of: a signal, a group of signals and a portion of a signal.

8. The method according to claim 1 and wherein said query signal is one portion of an input signal and said reference signal is another portion of said input signal.

9. The method according to claim 1 and wherein said query signal and said reference signal are at least one of the following types: a visual signal, an image, a video sequence, an acoustic signal, an electrical signal, a radar signal, a seismic signal, a audio signal, a sonar signal, a thermal signal, a medical signal, a medical image, functional magnetic resonance imaging (FMRI) data, an ultrasound signal, an electrocardiogram signal, x-ray data, range data, multi-spectral data, DNA sequence, amino acid sequence, protein data, text data, and an N-dimensional signal where N is an integer.

10. The method according to claim 1 and wherein said searching comprises:
   for each point q in said query signal, determining candidate small regions in said reference signal which are similar to a small region in the vicinity of point q;
   for each candidate region of q, maximally expanding each said candidate region while increasing said local evidence score of said region; and
   for each point q, choosing its region as the expanded region with the maximal said local evidence score.

11. The method according to claim 1 and wherein said regions are represented by an ensemble of patch descriptors.

12. The method according to claim 1 and wherein said local evidence score LES is defined as:

$$LES(R \mid H_{ref}) = \log_2(LR(R))$$

$$LR(R) = \frac{P(R \mid H_{ref})}{P(R \mid H_0)} = \frac{\sum_T P(R \mid T, H_{ref}) P(T \mid H_{ref})}{P(R \mid H_0)}$$

where P indicates a probability function, $H_{ref}$ is the hypothesis that a region R was generated by reference REF, $H_0$ is the null hypothesis and T is a transformation of a region of REF.

13. The method according to claim 12 and wherein said local evidence score is defined as a point evidence score PES, as follows:

$$PES(q : H_{ref}) = \max_{R, s.t. q \in R} \frac{LES(R \mid H_{ref})}{|R|}$$

where $H_{ref}$ is the hypothesis that a region R was generated by reference REF, and |R| is the size of R.

14. The method according to claim 1 and wherein said local evidence score includes a transformation and wherein said transformation is at least one of the following types of geometric transformations: identity, translation, rigid, rotation, reflection, scaling, affine, projective, and non-rigid.

15. The method according to claim 1 and wherein said global evidence score (GES) is defined as at least one of:

$$GES(Q \mid H_{ref}) = \log \frac{P(Q \mid H_{ref})}{P(Q \mid H_0)} =$$

-continued $$\log \sum_S \frac{P(Q|H_{ref}, S)P(S|H_{ref})}{P(Q|H_0)} = \log \sum_S P(S|H_{ref}) \frac{P(Q|H_{ref}, S)}{P(Q|H_0)}$$

where P indicates a probability function, $H_{ref}$ is the hypothesis that a region R was generated by reference REF, $H_0$ is the null hypothesis, Q is said query signal and S is a segmentation of Q; and also comprising:
    computing at least one of an upper bound on $GES(Q|H_{ref})$ and a lower bound on $GES(Q|H_{ref})$.

16. The method according to claim 1 wherein said signals are digital media and also comprising:
    generating importance scores of at least portions of query digital media as a function of at least one of local evidence scores and global evidence scores with respect to said reference digital media; and
    enabling exploring said query digital media according to said importance scores.

17. The method according to claim 16 and wherein said importance scores are at least one of the following: user defined, pre-defined, defined by saliency within said query digital media, defined by similarity to objects, defined by similarity to actions and defined by similarity to speech and defined by irregularity in said query digital media.

18. The method according to claim 17 and comprising measuring said irregularity relative to one of the following: preceding data within said query digital media, present data within said query digital media, the entire query digital media, other portions of data within said query digital media and external reference digital media.

19. The method according to claim 16 and wherein said enabling comprises at least one of: enabling navigating through said query digital media as a function of at least one of importance scores, associations, labels and markings in said digital media, enabling moving through said query digital media at adaptive speeds as a function of the importance scores of said query digital media, enabling jumping to another interesting part of said query digital media according to said importance scores and enabling highlighting important regions in said query digital media, wherein said important regions have high importance scores.

20. The method according to claim 16 and wherein said enabling comprises enabling focusing on interesting parts of a current portion of said query digital media, wherein said interesting parts are defined by said importance scores.

21. The method according to claim 20 and wherein said enabling focusing comprises at least one of: cropping the uninteresting parts of said current portion, changing the temporal length of the video sequence, generating a shorter video clip, playing only said interesting parts of said current portion, omitting the uninteresting parts of said current portion and changing the display size to one of the following: the size of a mobile phone screen, a movie screen, a TV screen, an MP player screen, a portable screen, a thumbnail and an image preview.

22. The method according to claim 20 and also comprising generating one of the following: a video thumbnail, a video clip, a video summary, a movie trailer, a video synopsis, a video preview, a video index and a story board.

23. The method according to claim 16 and wherein said enabling comprises also ranking portions of said query digital media as a function of said importance scores.

24. The method according to claim 23 and also comprising sorting items as a function of said ranking, wherein said items are one of the following: image files, video sequence files, audio files, file directories, files found on the internet and files retrieved by a search engine.

25. The method according to claim 16 wherein said query digital media is a set of items, wherein said items are at least one of: images and video sequences, and also comprising extracting important items from said query digital media, wherein said important items have high importance scores.

26. The method according to claim 25 and also comprising generating a summary of a file directory, wherein said file directory is said query digital media and said summary is said important items.

27. The method according to claim 26 and also comprising generating from said important items at least one of the following: a video summary, a video preview, a video synopsis and a video directory summary.

28. The method according to claim 16 and wherein said query digital media is one portion of input digital media and said reference digital media is another portion of said input digital media.

29. The method according to claim 1 wherein said signals are digital media and also comprising providing associations from said reference signal to regions of said query signal which have high local evidence scores.

30. The method according to claim 29 and also comprising using said associations for at least one of the following: enabling navigating through said query digital media, propagating markers within said digital media and propagating meta-data within said digital media.

31. The method according to claim 29 and wherein said query digital media is one portion of input digital media and said reference digital media is another portion of said input digital media.

32. A method for exploring media, the method comprising:
    generating importance scores of at least portions of query digital media as a function of at least one of local evidence scores and global evidence scores,
    wherein said local evidence scores are functions at least of a quality of the match of regions of reference digital media to regions of said query digital media and of their statistical significance, and
    wherein said global evidence score defines the extent of a global similarity of a portion of said query digital media to said reference digital media; and
    enabling exploring said query digital media according to said importance scores,
    wherein said generating comprises:
    for at least one point q in said query digital media, determining one or more candidate regions in said reference digital media which are similar to a region in the vicinity of said point q;
    for each said candidate region computing a local evidence score of said region; and
    associating with said region in the vicinity of said point q a local evidence score which is a function of at least one of said local evidence scores of said candidate regions.

33. The method according to claim 32 and wherein said digital media comprises one of the following types of media: images, video sequences and audio data.

34. The method according to claim 32 and wherein said enabling comprises at least one of:
    navigating through said query digital media as a function of at least one of importance scores, associations, labels and markings in said digital media;
    playing through said query digital media at adaptive speeds as a function of the importance scores of said query digital media;

jumping to another interesting part of said query digital media according to said importance scores; and highlighting important regions in said query digital media, wherein said important regions have high importance scores.

36. The method according to claim 32 and wherein said enabling also comprises focusing on interesting parts of a current portion of said query digital media, wherein said interesting parts are defined by said importance scores.

36. The device The method according to claim 35 and wherein said focusing comprises at least one of:
cropping the uninteresting parts of said current portion;
changing the temporal length of the video sequence;
playing only said interesting parts of said current portion; and
changing the display size to one of the following: the size of a mobile phone screen, a movie screen, a TV screen, an MP player screen, a portable screen, a thumbnail and an image preview.

37. The method according to claim 35 and also comprising generating one of the following: a video thumbnail, a video clip, a video summary, a movie trailer, a video synopsis, and a video preview.

38. The method according to claim 32 and wherein said enabling also comprises ranking portions of said query digital media as a function of said importance scores.

39. The method according to claim 38 and also comprising sorting items as a function of said ranking, wherein said items are one of the following: image files, video sequence files, audio files, file directories, files found on the internet and files retrieved by a search engine.

40. The method according to claim 32 wherein said query digital media is a set of items, wherein said items are at least one of: images and video sequences, and also comprising extracting important items from said query digital media, wherein said important items have high importance scores.

41. The method according to claim 40 and also comprising generating a summary of a file directory, wherein said file directory is said query digital media and said summary is said important items.

42. The method according to claim 32 and wherein said importance scores are at least one of the following: user defined, pre-defined, defined by saliency within said query digital media, defined by similarity to objects, defined by similarity to actions and defined by similarity to speech and defined by irregularity in said query digital media.

43. The method according to claim 32 and wherein said query digital media is one portion of input digital media and said reference digital media is another portion of said input digital media.

44. The method according to claim 32 and wherein said determining comprises:
finding candidate small regions in said reference digital media which are similar to a small region in the vicinity of said point q;
maximally expanding each said candidate region while increasing said local evidence score of said region; and
choosing for said point q its region as the expanded region with the maximal said local evidence score.

* * * * *